(12) United States Patent
Matsumoto et al.

(10) Patent No.: US 9,550,843 B2
(45) Date of Patent: Jan. 24, 2017

(54) METHOD FOR PRODUCING POLYACRYLIC ACID (SALT)-BASED WATER ABSORBENT RESIN

(71) Applicant: NIPPON SHOKUBAI CO., LTD., Osaka (JP)

(72) Inventors: Satoshi Matsumoto, Himeji (JP); Makoto Matsumoto, Himeji (JP); Seiji Kato, Himeji (JP); Kazumasa Konishi, Himeji (JP); Kenji Kadonaga, Himeji (JP); Shinichi Fujino, Himeji (JP)

(73) Assignee: Nippon Shokubai Co., Ltd., Osaka-shi (JP)

( * ) Notice: Subject to any disclaimer, the term of this patent is extended or adjusted under 35 U.S.C. 154(b) by 0 days.

(21) Appl. No.: 14/647,311

(22) PCT Filed: Nov. 27, 2013

(86) PCT No.: PCT/JP2013/081968
§ 371 (c)(1),
(2) Date: May 26, 2015

(87) PCT Pub. No.: WO2014/084281
PCT Pub. Date: Jun. 5, 2014

(65) Prior Publication Data
US 2015/0322180 A1    Nov. 12, 2015

(30) Foreign Application Priority Data

Nov. 27, 2012 (JP) .................................. 2012-258644
Aug. 29, 2013 (JP) .................................. 2013-178034

(51) Int. Cl.
*C08F 120/06*    (2006.01)
*C08J 3/12*    (2006.01)
(Continued)

(52) U.S. Cl.
CPC ................ *C08F 22/02* (2013.01); *C08J 3/245* (2013.01); *C08J 2333/02* (2013.01)

(58) Field of Classification Search
None
See application file for complete search history.

(56) References Cited

U.S. PATENT DOCUMENTS

RE32,649 E    4/1988    Brandt et al.
4,905,917 A    3/1990    Fetzer et al.
(Continued)

FOREIGN PATENT DOCUMENTS

CN    2326331 Y    6/1999
EP    0450922      10/1991
(Continued)

OTHER PUBLICATIONS

International Preliminary Report on Patentability for PCT/JP2013/081968, dated Jun. 11, 2015, and English translation thereof.
(Continued)

*Primary Examiner* — Vu A Nguyen
(74) *Attorney, Agent, or Firm* — Dickinson Wright PLLC

(57) ABSTRACT

An object of the present invention is to provide a simple method for improving and stabilizing the physical properties (for example, liquid permeability) of a water absorbent resin, without requiring investment in expensive facilities or modification of raw materials. In particular, the object is to provide a method which is useful in the large-scale production of a water absorbent resin. The method for producing polyacrylic acid (salt)-based water absorbent resin of the present invention includes, in order, a step in which an acrylic acid (salt)-based monomer aqueous solution is polymerized, a step in which the water-containing gel-like crosslinked polymer obtained in the polymerization step is dried, a step in which the dried polymer obtained in the
(Continued)

drying step is pulverized, and a classification step which takes place after the drying step or after the pulverizing step, wherein, at the time of providing the dried polymer to the roll mill used in the pulverizing step, the dried polymer is provided in a dispersed state in the axial direction of the roll of the roll mill.

15 Claims, 3 Drawing Sheets

(51) Int. Cl.
  *C08F 22/02* (2006.01)
  *C08J 3/24* (2006.01)

(56) References Cited

U.S. PATENT DOCUMENTS

| | | | |
|---|---|---|---|
| 4,973,632 | A | 11/1990 | Nagasuna et al. |
| 5,149,335 | A | 9/1992 | Kellenberger et al. |
| 5,244,735 | A | 9/1993 | Kimura et al. |
| 5,250,640 | A | 10/1993 | Irie et al. |
| 5,275,773 | A | 1/1994 | Irie et al. |
| 5,562,646 | A | 10/1996 | Goldman et al. |
| 5,669,894 | A | 9/1997 | Goldman et al. |
| 6,071,976 | A | 6/2000 | Dairoku et al. |
| 6,164,455 | A | 12/2000 | Kakita et al. |
| 6,291,636 | B1 | 9/2001 | Miyake et al. |
| 6,414,214 | B1 | 7/2002 | Engelhardt et al. |
| 6,641,064 | B1 | 11/2003 | Dentler et al. |
| 6,849,665 | B2 | 2/2005 | Frenz et al. |
| 2001/0011123 | A1 | 8/2001 | Kakita et al. |
| 2001/0025093 | A1 | 9/2001 | Ishizaki et al. |
| 2002/0128618 | A1 | 9/2002 | Frenz et al. |
| 2003/0020199 | A1 | 1/2003 | Kajikawa et al. |
| 2003/0087983 | A1 | 5/2003 | Kajikawa et al. |
| 2003/0224163 | A1 | 12/2003 | Dairoku et al. |
| 2004/0110006 | A1 | 6/2004 | Ishizaki et al. |
| 2004/0181031 | A1 | 9/2004 | Nogi et al. |
| 2004/0214946 | A1 | 10/2004 | Smith et al. |
| 2005/0096435 | A1 | 5/2005 | Smith et al. |
| 2005/0245684 | A1 | 11/2005 | Daniel et al. |
| 2005/0256469 | A1 | 11/2005 | Qin et al. |
| 2007/0293617 | A1 | 12/2007 | Riegel et al. |
| 2008/0114129 | A1 | 5/2008 | Herfert et al. |
| 2008/0125533 | A1 | 5/2008 | Riegel et al. |
| 2008/0194402 | A1 | 8/2008 | Chevigny |
| 2008/0202987 | A1 | 8/2008 | Weismantel et al. |
| 2008/0221237 | A1 | 9/2008 | Herfert et al. |
| 2008/0287631 | A1 | 11/2008 | Nitschke |
| 2009/0194462 | A1 | 8/2009 | Stueven et al. |
| 2009/0204087 | A1 | 8/2009 | Herfert et al. |
| 2009/0261023 | A1 | 10/2009 | Stueven et al. |
| 2009/0266747 | A1 | 10/2009 | Stueven et al. |
| 2010/0010461 | A1 | 1/2010 | Herfert et al. |
| 2010/0041550 | A1 | 2/2010 | Riegel et al. |
| 2010/0063469 | A1 | 3/2010 | Herfert |
| 2010/0101982 | A1 | 4/2010 | Konishi et al. |
| 2011/0042612 | A1 | 2/2011 | Riegel et al. |
| 2011/0166300 | A1 | 7/2011 | Dairoku et al. |
| 2011/0290920 | A1 | 12/2011 | Kim et al. |
| 2012/0016084 | A1* | 1/2012 | Dairoku ............... C08J 3/12 525/115 |
| 2012/0189793 | A1* | 7/2012 | Tsuneizumi ......... C08K 5/435 428/35.7 |
| 2012/0220733 | A1* | 8/2012 | Machida ............... C08J 3/122 525/384 |
| 2012/0220745 | A1 | 8/2012 | Machida et al. |
| 2013/0026412 | A1 | 1/2013 | Machida et al. |
| 2013/0066019 | A1 | 3/2013 | Okuda et al. |
| 2013/0123435 | A1 | 5/2013 | Okuda et al. |

FOREIGN PATENT DOCUMENTS

| | | |
|---|---|---|
| EP | 2479195 A1 | 7/2012 |
| JP | 63-162048 | 7/1988 |
| JP | 11-292919 | 10/1999 |
| WO | 20101114058 | 10/2010 |
| WO | 2011-034146 | 3/2011 |
| WO | WO 2011/149313 A2 | 12/2011 |
| WO | 2012/152647 | 11/2012 |

OTHER PUBLICATIONS

Official Notice of Reason for Refusal dated Dec. 8, 2015 that issued in corresponding Patent Application No. 2014-549879, including English translation.

Buchholz, F. et al., Modern Superabsorbent Polymer Technology, Wiley-VCR, 1998, pp. 69-117.

International Search Report for PCT/JP2013/081968, dated Mar. 11, 2014, and English translation thereof.

European Search Report dated May 31, 2016 that issued in the corresponding Patent Application No. 13857778.8.

* cited by examiner

METHOD FOR PRODUCING POLYACRYLIC ACID (SALT)-BASED WATER ABSORBENT RESIN

TECHNICAL FIELD

This application is based on Japanese Patent Application No. 2012-258644 filed on Nov. 27, 2012 and Japanese Patent Application No. 2013-178034 filed on Aug. 29, 2013, and their disclosures are incorporated herein by reference in their entirety.

The present invention relates to a method for producing a polyacrylic acid (salt)-based water absorbent resin. More specifically, the present invention relates to a method for producing a water absorbent resin which is used as an absorbent body of hygiene product such as a disposable diaper and a sanitary napkin, that is, a method for producing at low cost a polyacrylic acid (salt)-based water absorbent resin having excellent performance.

BACKGROUND ART

A water absorbent resin is recently developed as a substance having high water absorbent property, and is widely used mainly for a disposable purpose, for example, as an absorbent body of hygiene product such as a disposable diaper and a sanitary napkin, an agriculture/horticulture water retaining agent, an industrial waterproofing agent, and the like. Various kinds of water absorbent resin exist, and a large number of monomers and hydrophilic polymers exist as raw materials for such water absorbent resins. Among them, a polyacrylic acid (salt)-based water absorbent resin using acrylic acid and/or salt thereof as a monomer is most abundantly manufactured in the industry due to its high water absorption performance.

The water absorbent resin is produced through many steps such as polymerization step, drying step, pulverizing step, classification step, and surface cross-linking step (Patent Literatures 1 to 3 and Non-Patent Literature 1). In accordance with having high water absorption performance of a disposable diaper as a main use, the water absorbent resin is also required to have various functions. Specifically, without being limited simply to the quantity of water absorption capacity, the water absorbent resin is required to have various physical properties including gel strength, water soluble components (Patent Literature 4), water absorbent speed, water absorption capacity under load (Patent Literature 5), liquid permeability, particle size distribution, urine resistance, microbial resistance, impact resistance, powder fluidity, deodorizing property, color resistance, low dust, or the like. For such reasons, various suggestions relating to a surface cross-linking technique, additives, modifications of a step for production, or the like have been made in addition to Patent Literatures 1 to 23 and Non-Patent Literature 1. Recently, in accordance with an increased use amount of the water absorbent resin in a disposable diaper (for example, 50% by weight or more), the liquid permeability is found to be a more important factor. In addition, there have been many methods or techniques suggested for improving liquid permeability under load or liquid permeability without load like SFC (Saline Flow Conductivity/Patent Literature 6) and GBP (Gel Bed Permeability/Patent Literatures 7 to 9).

Further, regarding the aforementioned physical properties, many combinations of plural parameters including liquid permeability have been suggested, and a technique for defining impact resistance (FI) (Patent Literature 10), a technique for defining water absorbent speed (FSR/Vortex) (Patent Literature 11), a technique for defining a product of liquid diffusion property (SFC) and a core absorption amount after 60 minutes (DA60) (Patent Literature 12) are known.

Further, as a method for improving liquid permeability like SFC and GBP, a technique for adding gypsum either before or during polymerization (Patent Literature 13), a technique for adding a spacer (Patent Literature 14), a technique for using 5 to 17 [mol/kg] of a nitrogen-containing polymer which has a protonizable nitrogen atom (Patent Literature 15), a technique for using polyamine and polyvalent metal ions or polyvalent anions (Patent Literature 16), a technique for coating a water absorbent resin at pH of lower than 6 with polyamine (Patent Literature 17), and a technique for using polyammonium carbonate (Patent Literature 18) are known. Furthermore, a technique for using polyamine at soluble components of 3% by weight or more and a technique for defining withdrawing index (WI) or gel strength are known (Patent Literatures 19 to 21). Furthermore, a technique for using polyvalent metal salts with controlling methoxyphenol as a polymerization inhibitor in polymerization for improving coloration and liquid permeability is known (Patent Literatures 22 and 23).

Furthermore, a technique for controlling holding time between a drying step and a pulverizing step (Patent Literature 24), a technique for controlling the ratio of returning a pulverized product to a pulverizing step as a technique focusing on a pulverizing step (Patent Literature 25), a technique for eliminating electric charges as a technique focusing on a classification step (Patent Literature 26), a technique for using a tapping material (Patent Literature 27), and a technique for controlling tension of a screen mesh (Patent Literature 28) are also techniques for improving liquid permeability.

It is also known that the liquid permeability tends to decrease as the particle diameter of a water absorbent resin decreases. For example, as the content of particle having a particle diameter of less than 150 μm (fine powder) increases, the liquid permeability is known to decrease (Patent Literature 29). Accordingly, various techniques for controlling particle diameter have been suggested until now.

For example, a technique for controlling particle diameter during a polymerization step like reverse phase suspension polymerization (Patent Literatures 30 and 31), a technique for controlling particle diameter during a step of micronizing water-containing gel-like crosslinked polymer (gel-crushing step) (Patent Literatures 32 to 34), a technique for controlling particle diameter or the like during a classification step (Patent Literatures 26 to 28 and 35 to 40), a techniques for granulation during a surface cross-linking step (preparing large particles by adhering fine powders or fine powders and target particles) (Patent Literatures 41 and 42), and a technique for removing fine powders with air flow during a cooling step after surface cross-linking (Patent Literature 43) have been also suggested.

Furthermore, as techniques focusing on a pulverizing step, a technique for performing pulverization after cooling a dried polymer (Patent Literature 44), a technique for performing pulverization after heating or warming a pulverizer (Patent Literature 45), a technique for reducing the ratio of particles other than target product in a pulverization product by pulverizing a dried polymer having high moisture content (Patent Literature 46 (in particular, FIGS. 1 to 4)), a technique for using a three-stage roll mill (Patent Literature 47), a technique for controlling holding time between a drying step and a pulverizing step (Patent Literature 48), and a technique for controlling the returning ratio of a pulverized product to a pulverizing step (Patent Literatures 25 and 49) have been also suggested. Furthermore, a method having different roll revolution speed for two rolls for pulverization by a roll mill is also known (Non-Patent Literature 1 (in particular, FIG. 3.8)).

Furthermore, as a technique relating to pulverization, a technique for removing non-dried products in a dried polymer before pulverization (Patent Literatures 50 to 52) and a technique for installing a magnetic separator between a top part and a bottom part of a roll mill (Patent Literature 53) have been also suggested.

CITATION LIST

Patent Literature

Patent Literature 1: US 2003/0020199 A
Patent Literature 2: US 2004/0110006 A
Patent Literature 3: US 2003/0087983 A
Patent Literature 4: U.S. Reissue Pat. No. 32649
Patent Literature 5: U.S. Pat. No. 5,149,335
Patent Literature 6: U.S. Pat. No. 5,562,646
Patent Literature 7: US 2005/0256469 A
Patent Literature 8: US 2004/0214946 A
Patent Literature 9: US 2005/0096435 A
Patent Literature 10: U.S. Pat. No. 6,414,214
Patent Literature 11: U.S. Pat. No. 6,849,665
Patent Literature 12: US 2008/0125533 A
Patent Literature 13: US 2007/0293617 A
Patent Literature 14: US 2002/0128618 A
Patent Literature 15: US 2005/0245684 A
Patent Literature 16: US 2008/0221237 A
Patent Literature 17: US 2008/0202987 A
Patent Literature 18: US 2008/0114129 A
Patent Literature 19: US 2010/0063469 A
Patent Literature 20: US 2009/0204087 A
Patent Literature 21: US 2010/0010461 A
Patent Literature 22: US 2010/0041550 A
Patent Literature 23: US 2011/0042612 A
Patent Literature 24: US 2012/0016084 A
Patent Literature 25: US 2012/0220745 A
Patent Literature 26: US 2011/0166300 A
Patent Literature 27: US 2013/0066019 A
Patent Literature 28: US 2013/0123435 A
Patent Literature 29: U.S. Pat. No. 5,669,894
Patent Literature 30: U.S. Pat. No. 5,244,735
Patent Literature 31: U.S. Pat. No. 4,973,632
Patent Literature 32: U.S. Pat. No. 5,250,640
Patent Literature 33: U.S. Pat. No. 5,275,773
Patent Literature 34: US 2013/0026412 A
Patent Literature 35: U.S. Pat. No. 6,164,455
Patent Literature 36: US 2008/0202987 A
Patent Literature 37: US 2009/0261023 A
Patent Literature 38: US 2009/0194462 A
Patent Literature 39: US 2009/0266747 A
Patent Literature 40: US 2010/0101982 A
Patent Literature 41: EP 0450922 B
Patent Literature 42: U.S. Pat. No. 6,071,976
Patent Literature 43: US 2004/0181031 A
Patent Literature 44: US 2001/0025093 A
Patent Literature 45: US 2001/0011123 A
Patent Literature 46: US 2003/0224163 A
Patent Literature 47: US 2008/0194402 A
Patent Literature 48: US 2012/0016084 A
Patent Literature 49: US 2012/0220733 A
Patent Literature 50: U.S. Pat. No. 6,291,636
Patent Literature 51: U.S. Pat. No. 6,641,064
Patent Literature 52: US 2008/0287631 A
Patent Literature 53: WO 2012/152647 A Non-Patent Literature Non-Patent Literature 1: Modern Superabsorbent Polymer Technology pages 69 to 117

SUMMARY OF INVENTION

Like the aforementioned Patent Literatures 1 to 53, Non-Patent Literature 1, or the like, many suggestions have been made regarding a surface cross-linking technique, additives, modification of production process for improving physical properties of a water absorbent resin.

However, modification or addition of raw materials for a water absorbent resin such as a surface cross-linking agent or additives (polyamine polymer, inorganic microparticles, and thermoplastic polymer) sometimes causes not only lowered safety of raw materials or cost increase but also a decrease in other physical properties. Furthermore, addition of a new production step is a factor for having investment of expensive facilities or energy-related cost increase and it sometimes causes a decrease in productivity or physical properties as industrially complex operation is required. Furthermore, when continuous production with a pre-determined amount or more is performed, a decrease in physical properties is shown in accordance with scale-up or operation for a long period of time, and it cannot be complemented by fine control of operating conditions (in particular, polymerization and surface cross-linking).

Under the circumstances, an object of the present invention is, to solve the aforementioned problems, to provide a simple method for improving and stabilizing the physical properties (for example, liquid permeability) of a water absorbent resin, without requiring modification of raw materials or investment of expensive facilities. In particular, the object is to provide a method which is useful in the large scale production of a water absorbent resin.

As a result of consideration of the pulverizing step, the inventors of the present invention found that there is a difference in pulverization between large scale production of a water absorbent resin, in particular continuous production of 1 (t/hr) or more, and laboratory scale, and there is also deterioration of physical properties of a water absorbent resin to be obtained.

As a result of further consideration, the inventors of the present invention found that, regarding conventional pulverization using a roll mill, excessive wearing occurs on part of a roll so that pulverization load is concentratedly applied to that part. In this regard, it is believed that a decrease in productivity or physical properties of a water absorbent resin is caused by it. Accordingly, it was found that the aforementioned problems can be solved by dispersing the water absorbent resin after drying (dried polymer) in the axial direction of a roll with providing it to a roll mill.

Specifically, the invention of the present application (the first method) provides a method for producing polyacrylic acid (salt)-based water absorbent resin, the method including, in order, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, wherein, at the time of providing the dried polymer to a roll mill used in the pulverizing step, the dried polymer is provided in a dispersed state in the axial direction of a roll of the roll mill.

Furthermore, the invention of the present application (the second method) provides a method for producing polyacrylic acid (salt)-based water absorbent resin, the method including, in order, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, in which, in the pulverizing step in which process capacity per roll mill used for the pulverizing step is 100 (kg/hr) or more and total pulverization time is 30 days or more, a dried polymer is pulverized at conditions including that the width of roll clearance change is 100 μm or less and/or the degree of roll clearance change is 50% or less. Meanwhile, the aforementioned width of roll clearance change and the degree of roll clearance change are defined by the following formulae.

[Mathematical Formula 1]

Width of roll clearance change (μm) =

(Maximum width of clearance between a pair of rolls) −

(Minimum width of clearance between a pair of rolls)

[Mathematical Formula 2]

Degree of roll clearance change (%) =

$$\frac{\{(\text{Maximum width of clearance between a pair of rolls}) - (\text{Minimum width of clearance between a pair of rolls})\}}{(\text{Maximum width of clearance between a pair of rolls})} \times 100$$

Furthermore, the invention of the present application (the third method) provides a method for producing polyacrylic acid (salt)-based water absorbent resin, the method including, in order, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, in which, in the pulverizing step in which process capacity per roll mill used for the pulverizing step is 100 (kg/hr) or more and total pulverization time is 200 days or more, a dried polymer is pulverized at conditions including that the width of roll clearance change is 300 μm or less and/or the degree of roll clearance change is 90% or less. Meanwhile, the aforementioned width of roll clearance change and degree of roll clearance change are defined by the following formulae.

[Mathematical Formula 3]

Width of roll clearance change (μm) =

(Maximum width of clearance between a pair of rolls) −

(Minimum width of clearance between a pair of rolls)

[Mathematical Formula 4]

Degree of roll clearance change (%) =

$$\frac{\{(\text{Maximum width of clearance between a pair of rolls}) - (\text{Minimum width of clearance between a pair of rolls})\}}{(\text{Maximum width of clearance between a pair of rolls})} \times 100$$

Furthermore, the invention of the present application (the fourth method) provides a method for producing polyacrylic acid (salt)-based water absorbent resin including, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, in which a moisture content of the dried polymer is 3.0 to 15% by weight, and at least one pair of rolls of a roll mill used for the pulverizing step includes a low speed roll and a high speed roll rotating in opposite directions, and the peripheral speed ratio thereof is from 1:1.05 to 1:10.

Furthermore, the invention of the present application (the fifth method) provides a method for producing polyacrylic acid (salt)-based water absorbent resin, the method including, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, in which convex-concave patterned grooves aligned in a stripe shape are present on a surface of a roll of the roll mill used for the pulverizing step, the grooves are tilted against a rotation axis of the roll, and the tilt direction of grooves is the same for the two rolls.

Meanwhile, the dependent claims of the present application or the preferred embodiments of the present application are not limited to the first method described above, but can be made to any one of the second to fifth methods. Further, preferably two or more, more preferably three or more, or still more preferably four or more of the first to fifth methods are performed, and particularly preferably all five methods are performed simultaneously.

DESCRIPTION OF EMBODIMENTS

Figure 1:
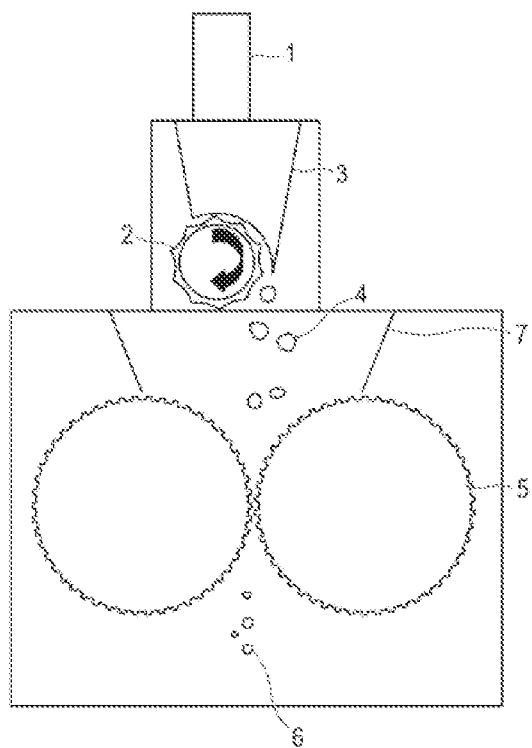
FIG. 1 is a cross-sectional view of a roll mill which is preferred for the present invention.

According to the production method of the present invention, a decrease in physical properties of a water absorbent resin like liquid permeability is not caused even by scale-up of production amount, in particular, large scale production of more than 1 (t/hr) per line or per pulverizer. Furthermore, as a change in the physical properties is small even during the production for long period of time, stable production can be achieved.

According to the production method of the present invention, particle size control, in particular, particle size distribution control can be easily made so that physical properties of a water absorbent resin like liquid permeability are improved. Furthermore, stable operation becomes possible, and thereby lifetime of a roll mill can be extended.

A method for producing a polyacrylic acid (salt)-based water absorbent resin of the present invention will be described in detail below, but the scope of the present invention is not constricted by these descriptions, and those other than the following exemplification can be carried out by appropriately changing them within such the range that the spirit of the present invention is not compromised. Specifically, the present invention is not limited to the following each embodiment, but can be variously changed within the scope shown in claims, and an embodiment obtained by appropriately combining technical means which are disclosed in different embodiments, respectively, is also included in the technical scope of the present invention.

[1] DEFINITION OF TERMS (1-1) "Water Absorbent Resin"

A "water absorbent resin" described in the present invention means a water swellable and water insoluble polymer gelling agent having the following physical properties. Specifically, it means a polymer gelling agent having "water swellable" property which refers to that CRC (water absorption capacity without load) defined in ERT441.2-02 (2002) is 5 (g/g) or more, and "water insoluble" property which refers to that Ext (water soluble components) defined in ERT470.2-02 (2002) is 50% by weight or less.

The water absorbent resin can be designed as appropriate in accordance with the purpose of use, and is not particularly limited, but it is preferably a hydrophilic crosslinked polymer which has been obtained by cross-linking and polymerizing unsaturated monomers having a carboxyl group.

The water absorbent resin of the present invention is not limited to a form in which the water absorbent resin is wholly (100% by weight) a polymer, and may be a water absorbent resin composition that contains an additive and the like as a component other than a water absorbent resin within a range in which the above described physical properties (CRC, Ext) are satisfied. Moreover, the water absorbent resin of the present invention is not limited to a final product, and can be an intermediate (for example, hydrogel after polymerization, a dried polymer after drying, water absorbent resin powder before surface cross-linking, or the like) obtained during manufacturing process of a water absorbent resin. As such, all of these are collectively referred to as "water absorbent resin" in this specification.

Meanwhile, examples of the shape of the water absorbent resin include sheet shape, fiber shape, film shape, particle shape, gel shape, and the like. However, the particulate water absorbent resin is preferred in the present invention.

(1-2) "Polyacrylic Acid (Salt)"

The "polyacrylic acid (salt)" of the present invention indicates a polymer that arbitrarily contains a graft component and contains, as a main component, acrylic acid and/or salt thereof (hereinafter, referred to as "acrylic acid (salt)") as a repeating unit.

Meanwhile, the "main component" indicates that an acrylic acid (salt) content (use amount) relative to the entire monomers (excluding an internal cross-linking agent) used in polymerization is in a range of normally 50% by mol to 100% by mol, preferably 70% by mol to 100% by mol, more preferably 90% by mol to 100% by mol, and still more preferably substantially 100% by mol. The polyacrylic acid salt as a polymer preferably contains a monovalent cation, and more preferably contains an alkali metal salt or an ammonium salt.

(1-3) "EDANA" and "ERT"

"EDANA" is an abbreviation for "European Disposables and Nonwovens Associations", and "ERT" is an abbreviation for "EDANA Recommended Test Methods" which is a European standard (which is substantially international standard) method for measuring water absorbent resin. In the present invention, physical properties of the water absorbent resin are measured in conformity to the original ERT (revised in 2002/publicly known document), unless otherwise specifically noted.

(a) "CRC" (ERT441.2-02)

"CRC" is an abbreviation for Centrifuge Retention Capacity, and means water absorption capacity without load (also referred to as "water absorption capacity"). Specifically, it is water absorption capacity (unit; g/g) measured after 0.2 g of a water absorbent resin in a nonwoven fabric is freely swollen in a large excess of a 0.9% by weight of sodium chloride aqueous solution for 30 minutes and drained by a centrifugal separator (at 250 G).

(b) "Ext" (ERT470.2-02)

"Ext" is an abbreviation for Extractables, and means a water soluble component (amount of water soluble components). Specifically, it is a value (unit; % by weight) obtained by measuring, by pH titration, an amount of a polymer that has been dissolved when 1.0 g of a water absorbent resin is stirred in 200 ml of a 0.9% by weight of sodium chloride aqueous solution at 500 rpm for 16 hours.

(c) "Residual Monomers" (ERT410.2-02)

"Residual monomers" indicates an amount of monomers that remain in a water absorbent resin (hereinbelow, referred to as "residual monomer"). Specifically, it is a value (unit; ppm) obtained by measuring, by high-performance liquid chromatography (HPLC), an amount of residual monomers that remain after 1.0 g of a water absorbent resin is stirred and dissolved in 200 ml of a 0.9% by weight of sodium chloride aqueous solution at 500 rpm for 1 hour.

(d) "PSD" (ERT420.2-02)

"PSD" is an abbreviation for Particle Size Distribution, and means a particle size distribution which is measured by sieve classification. A weight average particle diameter (D50) and a width of particle diameter distribution are measured in the same manner as disclosed in the specification of U.S. Pat. No. 7,638,570, columns 27 and 28 "(3) Mass-Average Particle Diameter (D50) and Logarithmic Standard Deviation ($\sigma\zeta$) of Particle Diameter Distribution".

(e) "Moisture Content" (ERT430.2-02)

"Moisture content" means a moisture content of a water absorbent resin. Specifically, it is a value (unit; % by weight) calculated from a drying loss when 4.0 g of a water absorbent resin has been dried at 105° C. for 3 hours. In the present invention, the amount of the water absorbent resin is changed to 1.0 g and the drying temperature is changed to 180° C.

(f) "AAP" (ERT442.2-02)

"AAP" is an abbreviation for Absorption Against Pressure, and means water absorption capacity under load. Specifically, it is water absorption capacity (unit; g/g) measured when 0.9 g of a water absorbent resin has swollen in a large excess of a 0.9% by weight of sodium chloride aqueous solution for 1 hour under a load of 2.06 kPa (21 g/cm$^2$, 0.3 psi). In the present invention, the load condition is changed to 4.83 kPa (49 g/cm$^2$, 0.7 psi).

(g) Other Physical Properties of Water Absorbent Resin Defined by EDANA

"pH" (ERT400.2-02): It means pH of a water absorbent resin.

"Flow Rate" (ERT450.2-02): It means dropping speed of a water absorbent resin.

"Density" (ERT460.2-02): It means volume specific gravity of a water absorbent resin.

"Respirable Particles" (ERT480.2-02): It means respirable dust of a water absorbent resin.

"Dust" (ERT490.2-02): It means dust contained in a water absorbent resin.

(1-4) "Liquid Permeability"

In the present invention, "liquid permeability" of a water absorbent resin indicates a flowing property of a liquid which permeates between swollen gel particles under a load or without load, and a representative measurement method includes SFC (Saline Flow Conductivity) or GBP (Gel Bed Permeability).

"SFC (saline flow conductivity)" indicates liquid permeability of a 0.69% by weight of sodium chloride aqueous solution relative to a water absorbent resin under a load of 2.07 kPa, and is measured in conformity to an SFC testing method disclosed in U.S. Pat. No. 5,669,894 (Patent Literature 29).

"GBP (gel bed permeability)" indicates liquid permeability of a 0.9% by weight of sodium chloride aqueous solution relative to a water absorbent resin under a load or under free swell, and is measured in conformity to a GBP testing method disclosed in US 2005/0027268 A.

(1-5) "Water Absorbent Speed"

In the present invention, "water absorbent speed" of a water absorbent resin means water absorbing rate of the water absorbent resin absorbing aqueous solution. Examples of the representative measurement method include FSR (Free Swelling Rate) and Vortex.

"FSR" is an abbreviation of Free Swelling Rate and it represents speed of absorbing 20 g of 0.9% by weight of sodium chloride aqueous solution by 1.0 g of a water absorbent resin (unit; g/g/s) and "vortex" represents the speed of absorbing 50 ml of 0.9% by weight of sodium chloride aqueous solution under stirring by 2.0 g of a water absorbent resin (unit; second). Meanwhile, the specific measurement methods are described in the following examples.

(1-6) Others

In this specification, a range of "X to Y" means "X or more and Y or less". Moreover, "t (ton)", which is a unit of weight, means "metric ton", and "ppm" means "ppm by weight" or "ppm by mass", unless otherwise noted. Further, "weight" is synonymous with "mass", "parts by weight" is synonymous with "parts by mass", and "% by weight" is synonymous with "% by mass". Moreover, " . . . acid (salt)" means " . . . acid and/or salt thereof", and "(meth)acrylic" means "acrylic and/or methacrylic".

[2] METHOD FOR PRODUCING POLYACRYLIC ACID (SALT)-BASED WATER ABSORBENT RESIN (2-1) Step for Preparing Monomer Aqueous Solution This step is a step for preparing an aqueous solution which contains acrylic acid (salt) as a main component (monomer aqueous solution). Meanwhile, it is also possible to use, instead of a monomer aqueous solution, monomer slurry to the extent that water absorbent physical properties are not compromised. For the sake of convenience, it is described as a monomer aqueous solution.

(Acrylic Acid)

In the present invention, a known acrylic acid can be used, and a minor component like a polymerization inhibitor or an impurity is generally contained in the acrylic acid. As a polymerization inhibitor, phenols are preferable, and methoxyphenols are more preferable. Further, the content in a monomer aqueous solution is, from the viewpoint of polymerization property and color hue of a water absorbent resin, preferably 1 to 200 ppm, and more preferably 10 to 160 ppm. As for the impurity, the specification of US 2008/0161512 A can be referred to, for example.

(Monomers Used in Combination)

In the present invention, other monomers can be also used in combination with acrylic acid (salt). Examples of other monomers described above include water soluble or hydrophobic unsaturated monomers. More specific examples include the monomers that are described in paragraph [0035] of US 2005/215734 A (with the proviso that, acrylic acid is excluded). Meanwhile, the water absorbent resin of the present invention also encompasses those containing the aforementioned water soluble or hydrophobic unsaturated monomers as a copolymerization component.

(Basic Composition)

The water absorbent resin obtained in the present invention is polyacrylic acid (salt) obtained by cross-linking and polymerizing acrylic acid (salt). The polyacrylic acid salt is obtained by cross-linking polymerization after neutralizing acrylic acid with a basic composition (neutralizing step) or by neutralizing a water-containing gel-like crosslinked polymer, obtained by cross-linking polymerization of acrylic acid, with a basic composition (post-neutralization). Meanwhile, in the present invention, the term "basic composition" indicates a composition that contains a basic compound.

The basic compound can be, for example, any of alkali metal (hydrogen) carbonate, alkali metal hydroxide, ammonia, organic amine, and the like. In order to obtain a water absorbent resin that has a higher physical property, the basic compound is preferably strong alkaline substance, that is, alkali metal hydroxide such as sodium hydroxide, potassium hydroxide, or lithium hydroxide, particularly preferably sodium hydroxide.

Furthermore, in the present invention, it may or may not have neutralization with a basic composition containing an extremely small amount (for example, more than 0% by mol and 5% by mol or less relative to acrylic acid) of polycations such as hydroxide or (hydrogen) carbonate of polyvalent metals.

(Neutralizing Step)

The neutralizing step of the present invention encompasses neutralization of acrylic acid that is a monomer and neutralization (post-neutralization step) of a water-containing gel-like crosslinked polymer which has been obtained by cross-linking and polymerizing acrylic acid. The neutralization step can be carried out with a continuous method or a batch method regardless of a difference in neutralization. In this case, the continuous method is preferable. With regard to preferable neutralization conditions such as a device, a basic composition, temperature condition, and a retention time, descriptions disclosed in US 2011/0021725 A and US 2008/0194863 A can be preferably applied to the present invention.

Meanwhile, a neutralization rate in the present invention is preferably 10 to 90% by mol, more preferably 40 to 85% by mol, still more preferably 50 to 80% by mol, and particularly preferably 60 to 75% by mol, relative to acid groups in a monomer aqueous solution or a polymer. In a case in which the neutralization rate is lower than 10% by mol, the water absorption capacity without load (CRC) may be significantly decreased. On the other hand, in a case in which the neutralization rate is higher than 90% by mol, a water absorbent resin that has high water absorption capacity under load (AAP) may not be obtained, and therefore not preferable. The same applies to the neutralization rate of a water absorbent resin for a case in which neutralization is carried out after polymerization using unneutralized or low-neutralized acrylic acid, and furthermore the neutralization rate of a water absorbent resin in a final product.

(Internal Cross-Linking Agent)

The internal cross-linking agent which is used in the present invention is a compound that has two or more substituent groups capable of reacting with acrylic acid. Examples thereof include a cross-linking agent described in the $14^{th}$ column of U.S. Pat. No. 6,241,928, and one type or two or more types thereof are used. Meanwhile, in consideration of a water absorbent property and the like of a water absorbent resin to be obtained, it is preferable to use, during polymerization, a compound that has two or more of polymerizable unsaturated groups, and also a compound that is thermally decomposed at a later-described drying temperature or so, in particular, a cross-linking agent that has two or more of polymerizable unsaturated groups having a (poly) alkylene glycol structural unit (preferably, an allyl group, a (meth)acrylate group, particularly acrylate group), for example, di(meth)acrylate or tri(meth)acrylate having a (poly)alkylene glycol structural unit. The alkylene glycol structural unit is, for example, polyethylene glycol of which n number (number of repeating unit) is 1 to 100, preferably 6 to 50.

A use amount of the internal cross-linking agent is preferably 0.005 to 2% by mol, more preferably 0.01 to 1% by mol, and still more preferably 0.05 to 0.5% by mol, relative to the monomer. In a case in which the use amount of the internal cross-linking agent falls within the above range, it is possible to obtain an intended water absorbent property.

Meanwhile, other than the method in which cross-linking is carried out by adding an internal cross-linking agent before polymerization, the present invention can employ, for example, any of a method in which an internal cross-linking agent is added during or after polymerization so as to carry out cross-linking, a method in which a radical polymerization initiator is used to carry out radical cross-linking, and a method in which an electron ray, etc., is used to carry out radiation cross-linking. However, it is more preferable to employ a method in which a predetermined amount of internal cross-linking agent is added to the monomers in advance, and then polymerization is carried out so that cross-linking reaction and the polymerization are carried out simultaneously.

(Other Substances Added to Monomer)

According to the present invention, it is possible to add the following substances in addition to the above described substances in preparing a monomer aqueous solution. Specifically, in case the following substance(s) is (are) added, in order to improve various physical properties of the water absorbent resin, a water soluble resin or a water absorbent resin can be added by, when the monomer concentration in a monomer aqueous solution is 100% by weight, more than 0% by weight and preferably 50% by weight or less, more preferably 20% by weight or less, and/or various kinds of foaming agents (such as carbonate, azo compound, and gas bubbles), a surface active agent, a chelating agent, a chain transfer agent, and the like can be added by more than 0% by weight and preferably 5% by weight or less, and more preferably 1% by weight or less. Those substances can be added to a monomer aqueous solution and also can be added during the polymerization.

Meanwhile, by using the water soluble resin or the water absorbent resin, a graft polymer or a water absorbent resin composition (for example, a starch-acrylic acid polymer, a PVA-acrylic acid polymer, etc.) is generated. In the present invention, these polymers and the water absorbent resin composition are also collectively referred to as "polyacrylic acid (salt)-based water absorbent resin".

(Concentration of Monomer Component)

In the present step, a monomer aqueous solution is prepared by mixing each substance described above. At that time, the concentration of the monomer components in a monomer aqueous solution is, although not particularly limited, preferably 10 to 80% by weight, more preferably 20 to 75% by weight, and still more preferably 30 to 70% by weight from the viewpoint of physical properties of a water absorbent resin.

Furthermore, when an aqueous solution polymerization or a reverse phase suspension polymerization is adopted as a polymerization mode, a solvent other than water may be used in combination, if necessary. In that case, type of the solvent for use is not particularly limited.

Meanwhile, the "concentration of monomer component" indicates the value that is obtained according to the following formula, and the graft component or water absorbent resin, hydrophobic solvent for reverse phase suspension polymerization are not included in the monomer aqueous solution.

Concentration of monomer component(% by weight)=(Weight of monomer component)/ (Weight of aqueous monomer solution)×100     [Mathematical Formula 5]

(2-2) Polymerizing Step

This step is a step in which an acrylic acid (salt)-based monomer aqueous solution obtained from the step for preparing monomer is polymerized to obtain a water-containing gel-like crosslinked polymer (hereinbelow, referred to as "hydrogel").

(Polymerization Initiator)

A polymerization initiator used in the present invention is selected as appropriate in accordance with a polymerization mode or the like and is not particularly limited. Examples of the polymerization initiator encompass a pyrolytic polymerization initiator, a photolytic polymerization initiator, a redox polymerization initiator in which a reducing agent for facilitating decomposition of any of those polymerization initiators is used in combination, and the like. Specifically, one type or two or more types of the polymerization initiator which has been exemplified in the $5^{th}$ column of U.S. Pat. No. 7,265,190 are used. Meanwhile, from the viewpoint of easy handlability or physical properties of a water absorbent resin, peroxides or azo compounds, moreover peroxides, and in particular persulfates are preferably used.

A use amount of the polymerization initiator is preferably 0.001 to 1% by mol, more preferably 0.001 to 0.5% by mol, relative to monomers. A use amount of the reducing agent is preferably 0.0001 to 0.02% by mol, relative to monomers.

Furthermore, polymerization reaction can be carried out by irradiation of active energy ray such as radiation ray, electron ray, or ultraviolet ray instead of using the polymerization initiator. Alternatively, the active energy ray and the polymerization initiator can be used in combination.

(Polymerization Method)

The polymerization method employed in the present invention is not particularly limited. From the viewpoint of water absorbent property, easiness in controlling polymerization, and the like, spray liquid-drop polymerization, aqueous solution polymerization, or reverse phase suspension polymerization is preferable. Aqueous solution polymerization or reverse phase suspension polymerization is more preferable. An aqueous solution polymerization is still more preferable. Among them, continuous aqueous solution polymerization is particularly preferable, and it may be any of continuous belt polymerization and continuous kneader polymerization.

As a specific example of polymerization mode, examples of continuous belt polymerization are disclosed in U.S. Pat. No. 4,893,999, U.S. Pat. No. 6,241,928, US 2005/215734 A, and the like, and examples of continuous kneader polymerization are disclosed in U.S. Pat. No. 6,987,151, U.S. Pat. No. 6,710,141, and the like. By employing these continuous aqueous solution polymerizations, efficiency in manufacturing the water absorbent resin is improved.

Preferred examples of the continuous aqueous solution polymerization include high temperature initiating polymerization and high concentration polymerization. The "high temperature initiating polymerization" is a polymerization method in which polymerization is started when a temperature of the monomer aqueous solution is preferably 30° C. or higher, more preferably 35° C. or higher, still more preferably 40° C. or higher, and particularly preferably 50° C. or higher (and an upper limit is a boiling point). The "high concentration polymerization" is a polymerization method in which polymerization is carried out with a monomer component concentration in the monomer aqueous solution of preferably 30% by weight or higher, more preferably 35% by weight or higher, still more preferably 38% by weight or higher, and particularly preferably 40% by weight or higher (and an upper limit is a saturating concentration). These polymerization methods can be used in combination.

Meanwhile, according to the above polymerization method, the solid content concentration can be increased during the polymerization. The degree of solid content increase as an indicator of an increase in solid content concentration is defined by the following formula.

Degree of solid content increase(% by weight)=
(Concentration of solid content in hydrogel after polymerization(% by weight)−(Concentration of solid content in monomer aqueous solution(% by weight)  [Mathematical Formula 6]

Meanwhile, the concentration of solid content in monomer aqueous solution represents the value obtained by the following formula and the components in a polymerization system include a monomer aqueous solution, a graft component, a water absorbent resin, and other solid matters (for example, water insoluble fine particles etc.), and a hydrophobic solvent for reverse phase suspension polymerization is not included therein.

[Mathematical Formula 7]

$$\text{Concentration of solid content in monomer aqueous solution (\% by weight)} = \frac{\left\{\text{Weight of}\begin{pmatrix}\text{monomer component} + \text{graft component} + \\ \text{water absorbent resin} + \text{other solid matters}\end{pmatrix}\right\}}{\text{(Weight of components in polymerization system)}} \times 100$$

The degree of solid content increase is preferably 1% by weight or more, and more preferably 2% by weight or more.

These polymerization methods can be carried out in an air atmosphere. From the viewpoint of color hue, the polymerization methods are preferably carried out in an atmosphere of inert gas such as nitrogen or argon. In this case, for example, it is preferable to control an oxygen concentration to 1% by volume or lower. It is possible to employ foaming polymerization which is carried out by dispersing gas bubbles (in particular, the inert gas described above, etc.) in a monomer aqueous solution. It is preferable that dissolved oxygen in the monomer or the monomer aqueous solution be sufficiently replaced in advance by inert gas (so that the dissolved oxygen exists by, for example, less than 1 (mg/l)).

(2-3) Gel-Crushing Step (Gel Pulverizing Step)

In this step, the hydrogel obtained in the polymerization step is gel-crushed with the use of, for example, a gel-crusher such as a kneader, a meat chopper, or a cutter mill so that particulate hydrogel (hereinafter, referred to as "particulate hydrogel") is obtained. Meanwhile, in a case in which the polymerization step is kneader polymerization, the polymerization step and the gel-crushing step are simultaneously carried out.

The gel-crushing step of the present invention is not particularly limited, and a gel-crushing method disclosed in US 2013/0026412 A can be preferably employed.

(2-4) Drying Step

In this step, the particulate hydrogel obtained in the polymerization step and/or the gel-crushing step is dried to obtain a dried polymer that has an intended resin solid content. The resin solid content is calculated from a drying loss (a change in weight when 1 g of a water absorbent resin is heated at 180° C. for 3 hours), and is preferably 80% by weight or higher, more preferably 85 to 99% by weight, still more preferably 90 to 98% by weight, and particularly preferably 92 to 97% by weight.

According to the present invention, the drying method is not particularly limited. However, one type or two or more types that are selected from various drying methods including, for example, heating drying, hot air drying, drying under reduced pressure, fluid bed drying, infrared drying, microwave drying, drum dryer drying, drying based on azeotropic dehydration with hydrophobic organic solvent, high humidity drying using high temperature steam, and the like are applied. Among those drying methods, from the viewpoint of the level of efficiency, the hot air drying is preferable. In particular, band drying by which hot air drying is performed on a belt (continuous through-flow belt-type drying) is preferable. Temperature of the hot air is, from the viewpoint of color hue and drying efficiency, preferably 100 to 250° C., more preferably 120 to 220° C., and still more preferably 150 to 210° C. Further, as for the other conditions for performing band drying, the conditions described in, for example, US 2008/0124749 A, US 2012/0157644 A, US 2012/0157648 A, US 2012/0329953 A, and the like are referred to.

By controlling the drying temperature and the drying time to fall within the above described ranges, it is possible to obtain the water absorbent resin of which water absorption capacity (CRC), water soluble component (Ext), and color hue fall within intended ranges (see [3] below).

According to the present invention, the dried polymer is preferably cooled after drying from the viewpoint of pulverizing efficiency of the pulverizing step. The cooling temperature at that time (temperature of dried polymer after cooling) is preferably lower than the drying temperature, more preferably 20 to 120° C., still more preferably 30 to 100° C., particularly preferably 35 to 90° C., and most preferably 40 to 80° C. Within this temperature range, it is subjected to the following pulverizing step.

(2-5) Pulverizing Step, Classification Step

In this step, water absorbent resin powder (for convenience, a powdery water absorbent resin before being subjected to surface cross-linking is referred to as "water absorbent resin powder") is obtained by pulverizing a dried polymer (pulverizing step) obtained in the drying step and classifying the pulverized polymer so that the particle size is adjusted to a predetermined range (classification step).

The embodiment according to the present invention (first method) is a method for producing a polyacrylic acid (salt)-based water absorbent resin including, in order, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, in which, at the time of providing the dried polymer to a roll mill used in the pulverizing step, the dried polymer is provided in a dispersed state in the axial direction of the roll of the roll mill.

(Pulverizing Apparatus)

The pulverizing apparatus used in the pulverizing step of the present invention includes a pipe or a conveyor for supplying a dried polymer to a roll mill, a means for dispersing the dried polymer in the axial direction of the roll of a roll mill, and a roll mill, and they are arranged in this order in a up and down direction. Meanwhile, the "up and down direction" is not limited to vertical direction, and has a concept of including a tilt direction.

As described herein, the roll mill indicates a pulverizer having a rotary roll, preferably plural rotary rolls, and more preferably a pair of two rotary rolls. By compression, shearing, or compaction between the rolls, the water absorbent resin is pulverized. Although a smooth-surface roll without having any teeth can be used as a rotary roll, a roll having teeth (other name; grooves) is preferably used. Furthermore, when plural rotary rolls are used, they may have the same or different diameter and also have the same or different rotation number or peripheral speed.

Furthermore, the roll mill is essentially included in the present invention, and in addition to the pulverizing apparatus, a high speed rotary type pulverizer such as a hammer mill, a screw mill, or a pin mill, a vibrating mill, a knuckle type pulverizer, a cylindrical mixer, a crusher having many pins on rotation axis, or the like can be also used in combination, if necessary. As described herein, "used in combination" indicates that the roll mill and other pulverizer are used in series or the roll mill and other pulverizer are used in parallel with divided dried polymer. In the case of the use in series, it is preferable that the roll mill be used after other pulverizer. On the other hand, in the case of the use in parallel, the process amount by the roll mill is preferably higher than that of other pulverizer.

Furthermore, in the case of the use in series, it is not limited to a case in which the entire amount of the dried polymer is pulverized by other pulverizer and then the entire amount of the obtained pulverized product is pulverized by a roll mill. Preferably, the main component, more preferably 70% by weight or more, and still more preferably 90% by weight or more (upper limit: 100% by weight) of the dried polymer is pulverized by a roll mill.

Hereinbelow, the operation method, etc. of the pulverizing apparatus of the present invention is described. However, the description relates to a roll mill pulverization method that is preferred (or essential) for any one of the first to the fifth methods of the present invention.

(Pipe or Conveyor)

In the present invention, the dried polymer obtained from the drying step is supplied to a roll mill by using one or more pipes or conveyors. The supply can be made at a single point or multiple points. At that time, from the viewpoint of production cost, no power device is preferably installed for the pipe used for the pulverizing step. Thus, the dried polymer preferably moves through the inside of the pipe by gravity (falling, in particular free falling) and is supplied to the roll mill.

The cross-sectional shape of the pipe is, although not particularly limited, preferably a circular shape having little dead space. Further, it is sufficient to have a pipe diameter (in the case of an angular pipe, inner width) to the extent which does not prevent movement of a dried polymer (falling, in particular free falling), and it is preferably 50 cm or less, more preferably less than 50 cm, and still more preferably 5 to 40 cm.

Furthermore, when the dried polymer is supplied to a roll mill by using a conveyor, the conveyor indicates a mechanical conveyor. Specific examples thereof include a belt conveyor, a screw conveyor, and the like.

(Dispersing Means (for the First Method, in Particular))

In the present invention (first method), it is essential that, at the time of providing the dried polymer to a roll mill used in the pulverizing step, the dried polymer is provided in a dispersed state in the axial direction of the roll of a roll mill.

As described herein, "the dried polymer is provided in a dispersed state in the axial direction of the roll" means that the dried polymer is supplied from multiple points lined in the axial direction of the roll, or the dried polymer is supplied, when seen from above, broadly in the axial direction of the roll but narrowly in the direction that is vertical to the axis. Meanwhile, "dispersion" can be performed periodically (per minute or per second, or more frequently) or continuously. It is preferably performed continuously.

According to a pulverizing method of a related art, when the dried polymer is supplied to a pulverizing apparatus, the dried polymer is directly supplied from a pipe to one part of the roll or directly supplied to a center part of a rotary roll. As such, due to retention of the dried polymer on top of the rotary roll, it is just naturally dispersed in the axial direction of the roll. However, the present invention is characterized in that the dried polymer is supplied after it is dispersed in advance in the axial direction of the roll.

In the present invention, examples of a means for dispersing the dried polymer in the axial direction of the roll include, although not particularly limited, the following means.

Figure 5:
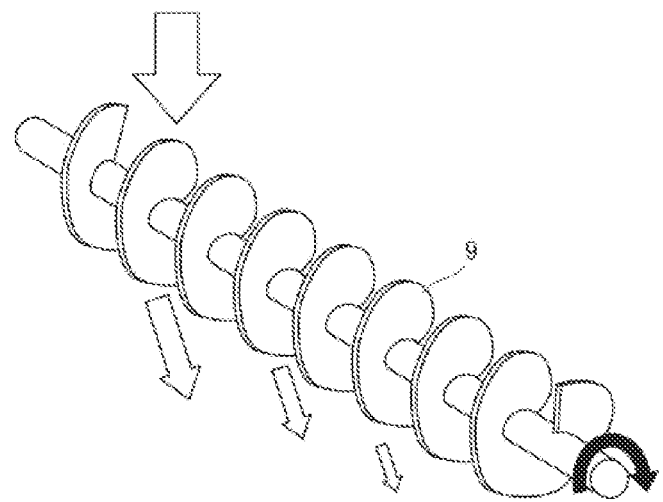
FIG. 5 is a schematic drawing illustrating one mode of a rotating part of a rotary type dispersing device which is preferred for the present invention and movement of a dried polymer (see the arrow).
Figure 6:
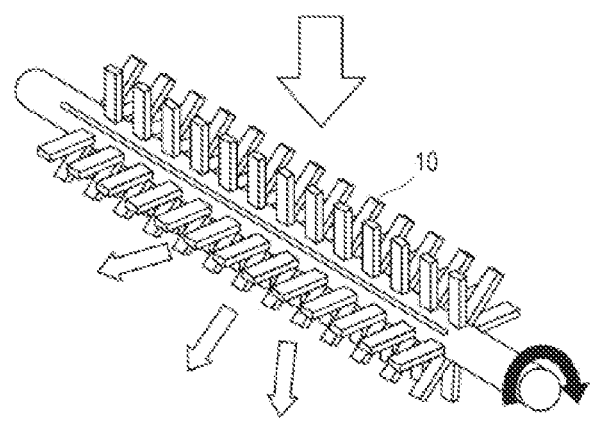
FIG. 6 is a schematic drawing illustrating another mode of a rotating part of a rotary type dispersing device which is preferred for the present invention and movement of a dried polymer (see the arrow).

In the present invention, the dried polymer is preferably dispersed by a mechanical means for dispersion. Examples of the mechanical means for dispersion include a vibrational or rotary type dispersing device (see, FIGS. 2, 5, and 6) like a dispersing roll which is installed parallel to the roll axis (other name: roll type dispersing device), in particular screw type (spiral type) feeder (see, FIGS. 2 and 5), a feeder having a pin type rotary blade (see, FIG. 6), a vibrational feeder or an oscillating feeder ("pendulum type conveyor or pipe" moving along the axial direction of a roll mill). Meanwhile, when an oscillating feeder is used, the dried polymer is supplied periodically (per minute or per second, or more frequently). Further, the period is suitably determined within a range in which homogeneous supply to a roll mill is achieved, and it is preferably 1 minute or shorter, and more preferably 10 seconds or shorter.

Furthermore, examples of a dispersing means other than the aforementioned mechanical dispersing means include a means for supplying from multiple points like branched pipe, dispersing plate, and in particular, plural dispersing plates.

Figure 3:
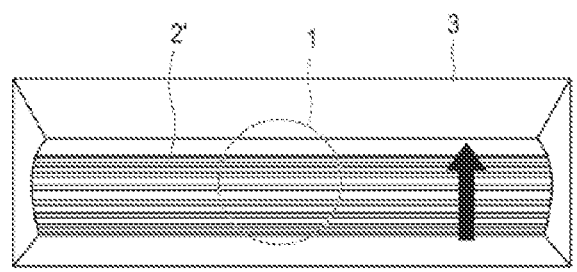
FIG. 3 is a schematic drawing of a storage container (equipped with a feeder for discharge) seen from above, in which the storage container has slit-shape holes on the bottom and is a dispersing means of a roll mill preferred for the present invention.

Furthermore, examples of these include a storage container, in particular a hopper having a bottom with almost the same width as the roll, and also having slits or multiple holes that are parallel to the axial direction of the roll mill (see, a storage container having slit-like holes formed on the bottom as illustrated in FIG. 3 (equipped with a feeder for discharge)). Meanwhile, for discharging the dried polymer, it is possible to use a feeder. Furthermore, when a hopper is installed, it is preferable that a knocker be installed on the hopper so that no bridge is formed in the dried polymer in the hopper and/or atmospheric temperature in the hopper and/or atmospheric relative humidity be adjusted to the atmospheric temperature and relative humidity of the pulverizing step that are described below.

Further, as an additional means for dispersion, there is a dispersing means by which the dried polymer is dispersed by scattering with air flow, etc.

Among them, from the viewpoint of dispersion efficiency, a rotary type dispersing device which is installed parallel to the roll axis (preferably, roll type dispersing device, in particular screw type feeder (see, FIGS. 2 and 5)), a feeder having a pin type rotary blade (see, FIG. 6), a vibrational feeder or an oscillating feeder, a dispersing plate, and an air flow-based dispersing means are preferable. Further, as a mechanical dispersing device, a power-driven dispersing means, that is, a rotary type dispersing device which is installed parallel to the roll axis (in particular, screw feeder), or a vibrational feeder or an oscillating feeder is more preferable. A rotary type dispersing device which is installed parallel to the roll axis (in particular, screw feeder) is still more preferable.

Figure 2:
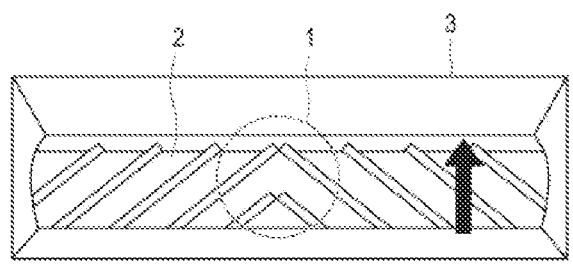
FIG. 2 is a schematic drawing of a screw type feeder seen from above, in which the screw type feeder is a dispersing means of a roll mill preferred for the present invention.
Figure 4:
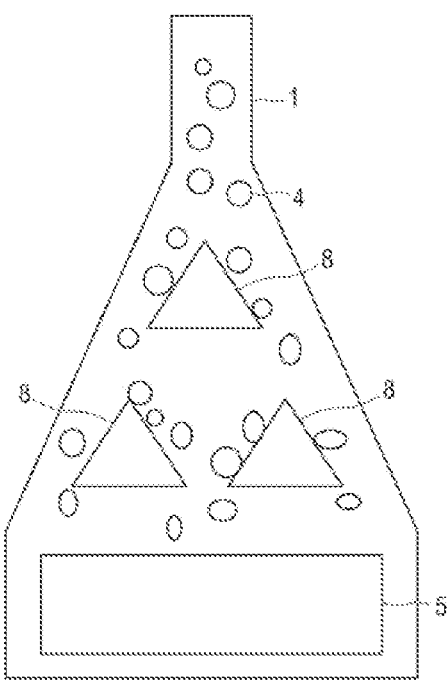
FIG. 4 is a cross-sectional view of a mountain-like dispersing plate when it is cut parallel to the roll axis, in which the dispersing plate is one mode of a dispersing means of a roll mill preferred for the present invention.

The rotary type dispersing device (in particular, screw feeder) has, although not particularly limited, a structure in which the dried polymer is moved to two terminals in the axial direction of the roll of the roll mill 5, when the pipe 1 for supplying the dried polymer is installed at center part in the axial direction of the roll of the roll mill 5, as it is represented in FIG. 2. Specifically, it is preferable to have a twist in opposite directions at both terminals while having a boundary at the center part in the axial direction of rotary type dispersing device. Furthermore, on the top part of the rotary type dispersing device, the hopper 3 may be installed. Furthermore, the dispersing device of a roll mill in which a mountain-like dispersing plate is used is also preferably used as represented by FIG. 4. Specifically, it is preferable that the pipe 1 for supplying the dried polymer be installed at center part of the mountain-like dispersing plate 8 (as illustrated in FIG. 4, when there are more than one mountain-like dispersing plate, at the center of the several dispersing plates) so that the dried polymer is supplied from the supplying pipe 1.

By using the aforementioned dispersing means (in particular, mechanical dispersion, and also dispersion by a rotary type dispersing device), homogeneous supply of the dried polymer to a roll mill is obtained and thus uneven roll wearing can be prevented, and therefore desirable.

Meanwhile, examples of the rotary type dispersing device include a rotary blade type, a rotary roll type dispersing device (having grooves) or the like. Furthermore, examples of the shape of the rotary blade include spiral shape, and examples of the grooves include spiral shape, horizontal grooves and the like.

Furthermore, in the present invention, the rotary type dispersing device which is installed parallel to the roll axis has almost the same length as the roll (preferably 0.5 times or more, more preferably 0.8 times or more, still more preferably 0.9 times or more, and particularly preferably 1.0 times).

(Structure of Roll Mill)

The roll mill used for the pulverizing step of the present invention preferably has, although not particularly limited, a convex-concave pattern on the roll surface. Furthermore, a pair of rolls may have the same or different shape (convex-concave pattern and diameter). However, rolls having the same shape (including symmetric relation) are preferably used.

(Convex-Concave Pattern and Inclination (Fifth Method, in Particular))

The aforementioned "convex-concave pattern" indicates irregularities on a roll surface, and specific examples thereof include those having grooves (also referred to as "creases") aligned in stripe shape, those covered with protrusions of triangle or rectangle shape, those having protrusions installed with an interval in which the protrusion are installed on top part of a triangle or rectangle shape, and the like. Among them, from the viewpoint of dispersion efficiency, those having grooves aligned in a stripe shape are preferred in the present invention.

Furthermore, with regard to the convex-concave pattern having grooves aligned in stripe shape, there are those having grooves that are extended above the roll periphery (a vertical direction to the rotation axis) (vertical groove structure, a device having this structure is referred to as a roll granulator) and those having grooves that traverse in the axial direction of the roll (a horizontal groove structure), and examples include a pair of rolls in which a vertical groove roll and a horizontal groove roll are combined and the one in which the grooves are tilted against the rotation axis of the roll. Among them, from the viewpoint of dispersion efficiency, it is preferable that the grooves be tilted against the rotation axis of the roll. Specific inclination angle is preferably 1 to 89°, more preferably 1 to 45°, still more preferably 1 to 30°, and particularly preferably 2 to 15°. Meanwhile, the inclination angle can be anyone of a plus direction or a minus direction relative to the rotation axis of a roll. By having such inclination angle, an occurrence of fine powder during a pulverizing step can be suppressed or physical properties of a water absorbent resin like liquid permeability can be improved. The reason is believed to be as follows: as shearing like cutting with scissors is applied during pulverization, control of particle diameter can be easily made. Furthermore, the inclinations of the grooves of two rolls are preferably in the same direction, and they are more preferably aligned parallel. Meanwhile, "inclinations of the grooves of two rolls are in the same direction" means that, when looked down from above in the axial direction of the roll, grooves on a surface of a pair of two rolls form a spiral in the same direction, and from an end of the roll at observation point to an other end of the roll at opposite side, grooves on a surface of a pair of two rolls forma spiral in clockwise or anti-clockwise direction.

Furthermore, the shape, distance, and height of the convex-concave pattern can be suitably determined, and although not particularly limited, the distance and height are preferably in the range of from 0.1 to 10 mm.

Namely, the present application (the fifth method) provides a method for producing polyacrylic acid (salt)-based water absorbent resin containing a polymerization step in which an acrylic acid (salt)-based monomer aqueous solution is polymerized, a drying step in which the water-containing gel-like crosslinked polymer obtained in the polymerization step is dried, a pulverizing step in which the dried polymer obtained in the drying step is pulverized, and a classification step which takes place after the drying step or after the pulverizing step, in which convex-concave patterned grooves aligned in a stripe shape are present on a surface of a roll of the roll mill that is used for the pulverizing step, the grooves are tilted against the rotation axis of the roll, and the tilt direction of grooves is the same for the two rolls.

Meanwhile, it is preferable to satisfy simultaneously the "inclination angle of the grooves relative to the rotation axis of a roll" and the "inclination of the grooves in two rolls are in the same direction". Moreover, it is also possible that a pair of rolls rotates in an opposite direction and rotates at peripheral speed ratio that is defined by the fourth method. Moreover, one or more of the first to the third methods can be applied at the same time.

(Cross-Section of Groove Structure)

The aforementioned grooves preferably have a sharp inclination angle so that it can exhibit a function of rotary blade, if necessary. Meanwhile, the "sharp inclination angle" means that the grooves have steep slope. Namely, the angle between groove slope and roll surface (between grooves) is small. In this case, it is also possible that both ends or only one end of the groove is prepared to have a sharp inclination angle. Furthermore, in the case of a pair of rolls in which the rotational directions are opposite to each other and the speed is different between two rolls, pulverizing is performed such that the dried polymer is inserted between a groove slope of one roll and a groove slope of the other roll. Furthermore, when the cross-section of the groove has an asymmetric shape, there are three combinations of a sharp angle and a non-sharp angle, that is, (1) sharp angle—sharp angle, (2) sharp angle—non-sharp angle, and (3) non-sharp angle—non-sharp angle. Among them, regarding the pulverization of a dried polymer which has moisture content defined in the present invention, the method (1) in which pulverizing is performed such that the dried polymer is inserted between sharp angles of a pair of rolls is more preferable.

(Roll Length)

The length of the roll in the roll mill used in the present invention (roll length) is, from the viewpoint of the effect of the present invention (which is more strongly exhibited at large scale), preferably 50 cm or more, more preferably 60 cm or more, still more preferably 70 cm or more, and particularly preferably 1 m or more. Furthermore, the upper limit of the roll length is, although not particularly limited, preferably 5 m or less, and more preferably 3 m or less.

Meanwhile, by having long roll length, the process capacity increases and the effect of the present invention is more strongly exhibited. To do so, it is preferable that the roll length be longer than the pipe diameter of a pipe for supplying the dried polymer to a roll mill (in the case of an angular pipe, inner width) or the width of a conveyor. From this viewpoint, roll length in the present invention is, relative to the pipe diameter of a pipe for supplying the dried polymer to a roll mill (in the case of an angular pipe, inner width) or the width of a conveyor, preferably 2 to 100 times, more preferably 3 to 50 times, and still more preferably 5 to 20 times. Namely, it is preferable in the present invention that the apparatus used for a pulverizing step include a pipe for supplying the dried polymer to a roll mill and the roll length of the roll mill is preferably 2 to 100 times the diameter of the pipe.

(Feed Width Ratio)

As described herein, "feed width ratio" indicates a value that is defined by the following formula, and it means a supply range width of a dried polymer relative to roll length. As the value increases, the dried polymer can be broadly supplied to a roll mill in the axial direction of a roll, and thus uneven wearing or the like is small.

[Mathematical Formula 8]

$$\text{Feed width ratio (\%)} = \frac{\left(\begin{array}{c}\text{Length of the portion on}\\\text{roll to which dried polymer is supplied}\end{array}\right)}{\text{(Roll length)}} \times 100$$

In the present invention, the feed width ratio is preferably 50 to 100%, more preferably 60 to 100%, still more preferably 70 to 100%, and particularly preferably 80 to 99%, and most preferably 90 to 99%. The feed width ratio can be controlled by a dispersing means described above.

As the feed width ratio is within the aforementioned range, the dried polymer can be broadly supplied to a roll mill in the axial direction of a roll, and thus even wearing of a roll mill is obtained and, even after the wearing, the pulverization can be continued with minor adjustment of roll clearance. Furthermore, replacement frequency of a roll mill can be reduced. Meanwhile, when the dried polymer is supplied to the end of a roll, there is a possibility that the dried polymer is not pulverized and passes through the roll. As such, it is desirable that the gap between internal wall of a pulverizing apparatus and a roll be sufficiently reduced or the feed width ratio is adjusted to 99% or lower. Furthermore, as the logarithmic standard deviation ($\sigma\zeta$) of the particle size distribution of an obtained pulverized product is small (sharp particle size distribution), the physical properties are stabilized even during an operation for a long period of time.

(Feed Distribution of Roll Mill)

According to the production method of the present invention, localization of supply point for the dried polymer supplied to a roll mill can be suppressed. As an indicator of degree of the localization, the evaluation can be made, by the ratio between a portion with the highest supply amount of the dried polymer and a portion with the lowest supply amount of the dried polymer, in dividing the roll into three identical sections in the axial direction of a roll. The ratio is preferably 1.0 to 10 times, more preferably 1.0 to 5 times, still more preferably 1.0 to 3 times, particularly preferably 1.0 to 2 times, and most preferably 1.0 to 1.5 times. As the ratio becomes close to 1.0, unevenness in supply point for the dried polymer is reduced and even supply is achieved. As a result, stable pulverization can be made and desired particle size distribution is obtained for the pulverized product. Furthermore, even wearing of the roll mill is obtained and, even after the wearing, the pulverization can be continued with minor adjustment of roll clearance. Furthermore, roll mill replacement frequency can be reduced.

According to a pulverization method of a related art, when supplying the dried polymer to a pulverizing apparatus, the dried polymer is directly supplied from a pipe to one area of the roll or it is directly supplied to a center part of a rotary roll. As such, the supply amount to a periphery region is 0 or extremely small. For such reasons, the feed distribution of roll mill which is defined in the present invention is either limitless or several thousand times (~several tens of thousand times) or more.

(Stage Number of Roll Mill)

The pulverizing apparatus for the pulverizing step of the present invention is generally a roll mill using a pair of two rolls. Although an one-stage roll mill having only one pair of roll mills or a multi-stage roll mill having plural pairs can be used, from the viewpoint of enhancing physical properties of a water absorbent resin or improving the durability of a roll mill, a multi-stage roll mill is preferable. In that case, the stage number is preferably 2 to 10 stages and more preferably 2 to 5 stages. Meanwhile, when a multi-stage is used, it is also possible to divide them into several series depending on stage number.

Meanwhile, when the dispersing means is installed in a multi-stage roll mill for the present invention (the first method, in particular), it is essentially installed at upper part of the first-stage roll mill from the top. But it may be also installed at any position at the second- or following stage from the top.

Furthermore, in the case of a multi-stage roll mill, by arranging the rolls in parallel at each stage, the dried polymer pulverized by the first-stage roll mill from the top can be directly supplied to the lower roll mill (the second- or following stage roll mill). Accordingly, an operation of dispersing to a lower stage roll mill in the axial direction of a roll can be omitted.

(Roll Clearance)

In the present invention, a gap between rolls of a pair of roll mills (roll clearance) is suitably determined based on a desired particle size. However, it is preferably 0.1 to 10 mm, more preferably 0.15 to 5 mm, still more preferably 0.2 to 1.5 mm, and particularly preferably 0.3 to 1.2 mm. Meanwhile, in the case of using the roll mill in a multi-stage mode, it is preferably selected such that it is gradually narrowed down from the top stage to the bottom stage.

Furthermore, roll clearance for a one-stage roll mill or the minimum roll clearance for a multi-stage roll mill is a condition which has a significant impact on particle size of water absorbent resin powder. Roll clearance for a one-stage roll mill and the minimum roll clearance for a multi-stage roll mill are collectively referred to as "minimum roll clearance."

In the present invention, the minimum roll clearance is preferably 100 to 1000 µm (0.1 to 1 mm), more preferably 150 to 700 µm (0.15 to 0.7 mm), and still more preferably 200 to 500 µm (0.2 to 0.5 mm). When the minimum roll clearance is less than 100 µm, re-adjustment of the roll clearance becomes difficult, and there is a possibility of having shortened roll lifetime.

Furthermore, from the viewpoint of suppressing fine powder, improving physical properties like liquid permeability, and extending the lifetime of a roll mill, pulverization is made such that ratio of the minimum roll clearance value to the weight average particle diameter (D50) of a pulverized product, that is, Gap/D50, is preferably 0.35 to 2.2 times, more preferably 0.4 to 2.2 times, still more preferably 0.5 to 2.0 times, and particularly preferably 0.8 to 1.9 times. Meanwhile, the relationship between the minimum roll clearance value and the weight average particle diameter (D50) of a pulverized product is affected by particle size of a dried polymer which is supplied to a roll mill (in the case of using a multi-stage roll mill, it indicates a particle size of a pulverized product which has been pulverized by a roll present immediately before), peripheral speed ratio of a roll, a convex-concave pattern on roll surface, and the like.

Meanwhile, for measurement of the roll clearance, preferably a method of using an optical sensor or a space gauge (JIS B 7524 (2008)) and more preferably a method of using a space gauge (JISB 7524 (2008)) is employed, although it is not particularly limited thereto. Furthermore, due to irregularities on a roll surface, there is a case in which actual measurement value changes in the rotational direction of a roll even when the roll clearance is measured while the roll mill is fixed by a fixing device. In that case, the measurement is made by suitably rotating the roll and the average value is taken.

Furthermore, if the width of roll clearance change varies depending on measurement position due to uneven wearing of a roll, the measurement value at a position at which the maximum roll clearance is shown is used as roll clearance of that roll mill. Regarding the adjustment, it can be made for a position at which the maximum roll clearance is exhibited.

(Width of Roll Clearance Change, Degree of Roll Clearance Change (the Second and Third Methods, in Particular))

In the present invention, as one example of a means for achieving the first method described above (a dispersion method), the width of roll clearance change and degree of roll clearance change are controlled within a range described below.

As described herein, the "width of roll clearance change" is a value defined by the following formula and it indicates a difference between the maximum width of clearance and the minimum width of clearance, each between a pair of rolls.

Width of roll clearance change (µm)=(Maximum width of clearance between a pair of rolls)−(Minimum width of clearance between a pair of rolls) [Mathematical Formula 9]

Meanwhile, the "degree of roll clearance change" is a value defined by the following formula and it indicates a ratio of the difference between the maximum width of clearance and the minimum width of clearance, each between a pair of rolls, to the maximum width.

[Mathematical Formula 10]

$$\text{Degree of roll clearance change (\%)} = \frac{\left\{\begin{array}{l}(\text{Maximum width of clearance between a pair of rolls}) - \\ (\text{Minimum width of clearance between a pair of rolls})\end{array}\right\}}{(\text{Maximum width of clearance between a pair of rolls})} \times 100$$

In the present invention, the width of roll clearance change is preferably 100 µm or less, more preferably 80 µm or less, still more preferably 60 µm or less, further still more preferably 40 µm or less, particularly preferably 30 µm or less, and most preferably 20 µm or less (lower limit is 0 µm for all). Furthermore, the degree of roll clearance change (%) is preferably 50% or less, more preferably 40% or less, still more preferably 30% or less, further still more preferably 20% or less, particularly preferably 10% or less, and most preferably 5% or less (lower limit is 0% for all). Namely, for a pulverizing step in which the process capacity per roll mill used for the pulverizing step is 100 (kg/hr) or more and total pulverization time is 30 days or more, the dried polymer is preferably pulverized at conditions including that the width of roll clearance change is 100 µm or less and/or the degree of roll clearance change is 50% or less.

Meanwhile, at the time of starting the operation, the roll mill is usually used right after the maintenance and thus it preferably satisfies the width of roll clearance change and/or the degree of roll clearance change that are within the aforementioned range. It is also preferable in the present invention that having the width of roll clearance change and/or the degree of roll clearance change within the aforementioned range is also satisfied even when total process time (total pulverization time) is preferably 30 days or more (same meaning as 720 hours in total), more preferably after 92 days or more (upper limit is less than 200 days) while the process capacity per roll mill is 100 (kg/hr) or more. Meanwhile, the "process time is 30 days" means an operation for 720 hours in total, and if there is a break time of a day or a certain period of time, such break time is excluded therefrom. Thus, actual operation time (hr)×24 hours is converted to one day.

Meanwhile, for an operation for a long period of time like total process time (total pulverization time) is preferably 200 days or more, or more preferably 300 days or more while the process capacity per roll mill is 100 (kg/hr) or more, the width of roll clearance change and/or the degree of roll clearance change preferably satisfy the following range.

Namely, the width of roll clearance change for long-term operation (200 days or more) is preferably 300 µm or less, more preferably 200 µm or less, still more preferably 150 µm or less, further still more preferably 100 µm or less, particularly preferably 50 µm or less, and most preferably 30 µm or less (lower limit is 0 µm for all). Furthermore, the degree of roll clearance change for long-term operation is preferably 90% or less, more preferably 70% or less, still more preferably 50% or less, further still more preferably 40% or less, particularly preferably 30% or less, and most preferably 20% or less (lower limit is 0% for all). Thus, It is preferable that, in a pulverization process in which the process capacity per roll mill used for the pulverizing step is 100 (kg/hr) or more and total pulverization time is 200 days or more, the dried polymer be pulverized at conditions with a width of roll clearance change of 300 µm or less, and/or, a degree of roll clearance change of 90% or less.

By having the width of roll clearance change and/or (preferably, and) the degree of roll clearance change within the aforementioned range, particle size of a pulverized product can be easily adjusted.

Meanwhile, as a method for controlling the width of roll clearance change and degree of roll clearance change to a certain value or lower, for example, there is a method of selecting hardly-wearable material, increasing replacement frequency, or lowering the process capacity per unit time. In the present invention, however, a method of supplying a dried polymer with dispersing it in the axial direction of a roll is adopted.

Specifically, the present invention (the second method) provides a method for producing polyacrylic acid (salt)-based water absorbent resin including, in order, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, in which, for the pulverizing step in which process capacity per roll mill used for the pulverizing step is 100 (kg/hr) or more and total pulverization time is 30 days or more, a dried polymer is pulverized at conditions including that the width of roll clearance change is 100 µm or less and/or the degree of roll clearance change is 50% or less. Meanwhile, the aforementioned width of roll clearance change and degree of roll clearance change are defined by the above formulae.

Furthermore, the present invention (the third method) provides a method for producing polyacrylic acid (salt)-based water absorbent resin including, in order, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, in which, for the pulverizing step in which process capacity per roll mill used for the pulverizing step is 100 (kg/hr) or more and total pulverization time is 200 days or more, a dried polymer is pulverized at conditions including that the width of roll clearance change is 300 µm or less and/or the degree of roll clearance change is 90% or less. Meanwhile, the aforementioned width of roll clearance change and degree of roll clearance change are defined by the above formulae.

The present invention (the second and the third methods) is preferably achieved by using the first method (dispersing device). Meanwhile, as a means other than the aforementioned, changing the supply point of a dried polymer for every operation or every occurrence of wearing (for example, a dried polymer is supplied to a center part, a right end part, and a left end part of a roll mill every 30 days to have even wearing of a roll) can be mentioned. However, from the viewpoint of improving physical properties of a water absorbent resin to be obtained, the first method is preferable.

(Adjustment of Roll Clearance)

According to the production method of the present invention (the first to the fifth methods), uneven wearing of a roll can be reduced, and as a result, the roll replacement frequency can be reduced. Meanwhile, the roll replacement frequency is, although it is not particularly limited as it is also affected by the properties of a dried polymer or pulverization conditions, preferably 1 year or longer in terms of total operation time (24 hours×365 days in total).

Further, as the roll wears off evenly according to the present invention, the particle size of a pulverized product can be controlled by adjusting the roll clearance until roll replacement. Meanwhile, the particle size may change over time even during a long-term operation (preferably, continuous operation), the roll clearance can be adjusted while confirming the particle size.

(Roll Replacement Frequency)

In the present invention, the roll replacement frequency is affected by operation time, properties of a dried polymer and pulverization conditions. However, no replacement for at least one year is preferable. By suitably setting the roll clearance as described above, the roll clearance can be re-adjusted without being affected by uneven wearing of a roll, and thus the time until roll replacement, that is, lifetime of a roll, can be extended. Meanwhile, the roll having worn-off convex-concave pattern after use can be used again after creating a new convex-concave pattern.

(Rotation Number and Peripheral Speed of Roll (in Particular, the Fourth Method))

With regard to a roll mill used in the pulverizing step of the present invention in which two roll are used as a pair, a pair of rolls can have an inward rotation with opposite direction and a different speed. Meanwhile, "inward rotation" means a rotation mode in which two rolls bite the dried polymer in a top-down direction.

The rotation number of the roll is preferably 10 to 10000 rpm, more preferably 50 to 5000 rpm, and still more preferably 100 to 2000 rpm. Furthermore, the peripheral speed of the roll is preferably 0.5 to 50 (m/s), more preferably 0.7 to 30 (m/s), and still more preferably 1 to 20 (m/s).

Furthermore, for a pair of roll mills, the peripheral speed of the two rolls (or, rotation number when two rolls have the same diameter) may be the same or different from each other. However, from the viewpoint of achieving the present invention, different speed is preferable.

In such case, the rotation number and peripheral speed are suitably set to have different speed between a pair of rolls. In particular, the peripheral speed of a low-speed roll is preferably within the aforementioned range, more preferably 0.5 to 20 (m/s), still more preferably 0.7 to 15 (m/s), and particularly preferably 1 to 10 (m/s).

When the rotation number (peripheral speed) of a low-speed roll is increased, the process capacity increases, and accordingly, the rotation number (peripheral speed) of a high-speed roll also increases. However, when the rotation number of a high-speed roll increases excessively, fine powder tends to increase, and therefore undesirable.

From the aforementioned point of view, the peripheral speed ratio between a low-speed roll and a high-speed roll is preferably from 1:1.05 to 1:10 in the present invention. Namely, at least one pair of rolls of a roll mill includes a low-speed roll and a high-speed roll, which rotate in opposite direction to each other, and their peripheral speed ratio is from 1:1.05 to 1:10. This mode is particularly preferably applied when the moisture content in the dried polymer is 3.0 to 15% by weight. In other words, it is preferable that the moisture content in the dried polymer be 3.0 to 15% by weight, at least one pair of rolls of a roll mill, which is used for the pulverizing step, includes a low-speed roll and a high-speed roll, which rotate in opposite direction, and their peripheral speed ratio be from 1:1.05 to 1:10. The peripheral speed ratio between a low-speed roll and a high-speed roll is more preferably 1:1.1 to 1:9, still more preferably 1:1.5 to 1:8, and particularly preferably 1:2 to 1:5.

Herein, the preferred moisture content before roll mill pulverization is within the range described below.

Specifically, the present invention (the fourth method) provides a method for producing polyacrylic acid (salt)-based water absorbent resin including, in order, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverizing step, in which a moisture content of the dried polymer is 3.0 to 15% by weight and at least one pair of rolls of a roll mill that is used for the pulverizing step includes a low speed roll and a high speed roll rotating in opposite directions with peripheral speed ratio of from 1:1.05 to 1:10.

(Material of Roll)

The roll of a roll mill used in the present invention is, from the viewpoint of durability during long-term operation, preferably centrifugally chilled cast iron, and the material can be an alloy containing carbon (C), manganese (Mn), chrome (Cr), nickel (Ni), molybdenum (Mo) or the like in addition to iron (Fe).

(Heating of Roll Mill)

The roll mill used in the present invention is preferably heated (controlled at a pre-determined temperature) from the viewpoint of preventing adhesion. The heating temperature (temperature on wall face and roll surface of a roll mill) is preferably 30 to 100° C., more preferably 35 to 90° C., and still more preferably 40 to 80° C. Meanwhile, as a method for controlling the roll mill at a pre-determined temperature, there is a method of heating the roll mill from outside, a method of heating using conductive heat and frictional heat or pulverization heat from a dried polymer by continuously supplying a dried polymer which has been heated to a pre-determined temperature, or the like. However, a method of warming or heating a roll mill apparatus (entire apparatus) or the inside or surface of a roll of a roll mill is preferable. In that case, it is preferable that a heated liquid (for example, hot water) or gas be introduced to the inside of a roll or heated and/or dried gas be blown into the roll mill. The gas is preferably inert gas like nitrogen and air.

(Atmospheric Temperature and Relative Humidity of Atmosphere)

The pulverizing apparatus essentially including a roll mill used in the present invention is generally covered with a casing. Gas inside the casing is referred to as atmosphere of a pulverizing step, and it is preferably controlled as described below.

In the present invention, from the viewpoint of stabilizing the pulverization step, the atmospheric temperature during the pulverization step is preferably 30 to 100° C., more preferably 35 to 90° C., and still more preferably 40 to 80° C. Meanwhile, the atmospheric temperature is preferably controlled by heating the roll mill or blowing heating gas into the roll mill. The heating gas can be directly heated by using a heating source or indirectly heated by passing through the inside of a heated device. Excessive heating of a roll mil or gas may cause a difficulty in pulverization of a dried polymer, and therefore undesirable.

Furthermore, the relative humidity of an atmosphere during the pulverizing step is preferably 50% RH (relative humidity) or less, more preferably 45% RH or less, still more preferably 40% RH or less, and particularly preferably 35% RH or less. The lower limit of the relative humidity is, although not particularly limited, preferably 1% RH or more from the viewpoint of cost performance.

Meanwhile, the relative humidity of an atmosphere is controlled by blowing a gas into a pulverizing apparatus, and the preferred temperature range and relative humidity of the gas are the same as the aforementioned preferred range of the atmospheric temperature and relative humidity within a roll mill.

(Atmospheric Pressure)

The atmospheric pressure during the pulverizing step of the present invention can be any one of normal pressure, increased pressure, and reduced pressure. However, it is preferably reduced pressure. In that case, the pressure may be reduced only slightly or it is reduced by preferably 0.01 to 30 kPa, and more preferably by 0.05 to 10 kPa relative to the atmospheric pressure.

Further, more preferred mode includes pulverization under reduced pressure and/or air stream (at conditions in which gas phase flows from the entrance to exit of a roll mill). In that case, the preferred conditions for air stream are the same as the aforementioned atmosphere inside a pulverizing apparatus.

(Process Capacity and Process Time)

The production method according to the present invention is preferably applied for large-scale continuous pulverization, in particular continuous pulverization for 24 hours or longer in which the process capacity for the dried polymer is 100 (kg/hr) or more. The process capacity of a dried polymer by continuous pulverization is preferably 200 (kg/hr) or more, more preferably 500 (kg/hr) or more, and still more preferably 1000 (kg/hr) or more. Meanwhile, the upper limit of the process capacity is 20 (t/hr) or so from the viewpoint of easy operability.

Furthermore, the process time for continuous pulverization is preferably 24 hours or more, more preferably 5 days or more, still more preferably 10 days or more, and particularly preferably 30 days or more. Furthermore, total process time (total pulverizing time) by continuous pulverization or intermittent pulverization is preferably 30 days or more, more preferably 60 days or more, still more preferably 90 days or more, particularly preferably 200 days or more, and most preferably 1 year or more. As long as it is within the roll replacement time, the upper limit is not particularly limited. For example, it is 5 years, and preferably 4 years.

By performing the production method of the present invention, uneven wearing of a roll mill is prevented, and as a result, a deterioration of physical properties over time at large scale can be prevented. Meanwhile, by having one or more series of continuous pulverization, the effect of the present invention can be exhibited even at a large scale at which the production amount of a water absorbent resin is more than 1 (t/hr).

(Dried Polymer Before Pulverization by Roll Mill)

The dried polymer obtained from the drying step of the present invention may be directly pulverized as a whole by a roll mill. However, depending on the shape of the dried polymer, it may be subjected to a separate step such as a crude pulverizing step or a crude crushing step and also a classification step before pulverization by a roll mill.

Meanwhile, the "crude pulverizing step" means a step for pulverizing primary particles, and the "crude crushing step" means a step for disintegrating aggregated particles. Thus, when the dried polymer is aggregated in a plate shape, block shape or the like, by band drying or the like, the dried polymer can be subjected in advance to crude pulverization or crude crushing to have efficient pulverization by a roll mill.

Furthermore, it is preferable that the dried polymer obtained from a drying step be subjected to a classification step before pulverization by a roll mill such that a pass through and a non-passing material are separated in advance by using a sieve with pre-determined meshes. In that case, the size of sieve mesh (defined by JIS Z8801-1 (2000)) is preferably 1 to 100 mm, more preferably 2 to 80 mm, and still more preferably 5 to 50 mm.

The non-passing material separated by the above-described sieve (for example, non-passing material on a sieve having a mesh size of 10 to 30 mm) can be removed during a process for producing a water absorbent resin. However, from the viewpoint of yield and productivity, it is preferably pulverized by a pulverizing method other than a roll mill, dried again, if necessary, and then mixed with a pulverized product discharged from a roll mill. Namely, it is preferable that before pulverizing the dried polymer by a roll mill, a classification step for classifying the dried polymer obtained from the drying step be included, a non-passing material on a sieve used for the classification step be separated, and the separated non-passing material be pulverized by a pulverization method other than a roll mill. Meanwhile, examples of the pulverization method other than a roll mill include a knife mill, a hammer mill, a pin mill, a screw mill, a vibration mill, a gyratory crusher, a cone crusher, a knuckle type pulverizer, a cylindrical mixer, and the like. Among them, the pin mill is particularly preferable. Meanwhile, the pass through separated by the sieve (for example, pass through under a sieve having a mesh size of 10 to 30 mm) may be pulverized by a roll mill.

Furthermore, when classification of a dried polymer is performed before pulverization with a roll mill, for example, using a sieve with a mesh size of 850 μm (defined by JIS Z8801-1 (2000)), a pass through under the sieve (dried polymer having a particle diameter of less than 850 μm) can be subjected to pulverization by a pulverization method other than a roll mill, granulation, or recycling of fine powder. However, it is preferably mixed by itself with a water absorbent resin powder and used as a water absorbent resin. Meanwhile, the non-passing material on the sieve (dried polymer having a particle diameter of 850 μm or more) may be pulverized by a roll mill.

Specifically, by separating the non-passing material, for example, under a sieve having a mesh size of 10 to 30 mm, excess load on a roll mill as caused by pulverization of coarse particles does not occur and sudden stop of a roll mill or a decrease in productivity does not occur. As such, the roll mill pulverization can be performed efficiently. Furthermore, by separating the pass through, for example, under a sieve having a mesh size of 850 μm, pulverization does not proceed more than required and thus the generation amount of fine powder is reduced.

(Properties of Dried Polymer Before Pulverization by Roll Mill)

Moisture content in the dried polymer of the present invention (as defined by the method described in Examples) is 1 to 20% by weight, 2 to 15% by weight, or 3 to 10% by weight, for example. Furthermore, moisture content in the dried polymer of the present invention is, right before pulverization with a roll mill, preferably 3.0 to 15% by weight, more preferably 3.5 to 12% by weight, and still more preferably 4.0 to 9.0% by weight. Meanwhile, the moisture content may be different between the average value of the dried polymer as a whole which is obtained after drying by a drying step and a dried polymer pulverized by a roll mill according to classification before pulverization. Furthermore, the particle size of the dried polymer of the present invention (as defined by the method described in Examples) is, in terms of the weight average particle diameter (D50) before pulverization by a roll mill, 0.5 to 50 mm, more preferably 0.7 to 10 mm, and still more preferably 1.0 to 5.0 mm. Meanwhile, properties of the dried polymer greatly depend on the gel crushing step or drying step. Thus, for other properties, reference can be suitably made to the descriptions about gel-crushing step or drying step that are described below.

(Classification Step)

According to the present invention, the classification step is performed after the drying step or the pulverizing step. As described herein, "classification step after the drying step or the pulverizing step" and "classification step is performed after the drying step or the pulverizing step" mean that the classification step is performed after at least one of the drying step and the pulverizing step. Specifically, the following modes are included: (a) a mode in which polymerization step→drying step→pulverizing step→classification step are performed in order; (b) a mode in which polymerization step→drying step→classification step→pulverizing step are performed in order; and (c) a mode in which polymerization step→drying step→classification step→pulverizing step→classification step are performed in order. Among them, the modes (a) and (c) are preferable.

In the present invention, examples of the classification method include such as sieve classification using a JIS standard sieve (JIS Z8801-1 (2000)) or an equivalent thereof and an airstream classification, although it is not particularly limited thereto. Among them, the sieve classification is particularly preferable. Furthermore, the classification method disclosed in Patent Literatures 26 to 28, 35 to 40 is also suitably applied.

Meanwhile, the classification method is applied to any one of classification before pulverization by a roll mill or classification after pulverization by a roll mill.

Meanwhile, the particle size control of a water absorbent resin of the present invention is not limited to the pulverizing step or classification step, and it is suitably performed during the polymerization step (in particular, reverse phase suspension polymerization or spray liquid droplet polymerization) or other steps (for example, granulation step and a fine powder recycling step).

(Washing)

According to the present invention, the roll mill is preferably regularly washed from the viewpoint of stabilizing the physical properties. Dry type washing is particularly preferable. Preferred examples of the dry type washing include brushing, vacuum, and the like although it is not particularly limited thereto.

For sieve classification, it is also preferable to have regular washing. It is particularly preferable to washing (water washing) with water. The water washing is performed in view of the descriptions of paragraphs [0036] to [0086] of Japanese Patent Application No. 2011-200221. The corresponding descriptions are incorporated in the present invention.

Specifically, it is preferable in the present invention to water wash a sieve regularly. It is particularly preferable that the sieve be detached from a classification device and water washed by immersion in water or spraying with water. Namely, immersion in water or washing of a sieve with jet water stream is preferable.

In the case of performing the washing with jet water stream, it is possible to use pressurized water stream with super high pressure (gauge pressure of 500 (kg/cm$^2$) or higher). However, from the viewpoint of washing efficiency, pressurized water stream with gauge pressure of preferably 1 to 400 (kg/cm$^2$), and more preferably 5 to 200 (kg/cm$^2$) is used.

The washing cycle is not particularly limited, and it can be suitably selected depending on each apparatus for production, for example, every 12 hours, every 24 hours, every 5 days, every 10 days, every 30 days, every 45 days, every 60 days, every 75 days, every 120 days, every 150 days, or the like. Meanwhile, the upper limit of the washing cycle can be suitably selected like every 300 days, every 200 days, or the like depending on production amount of a water absorbent resin or product number or the like, as it is applied to large-scale maintenance of a production apparatus which is performed once a year.

(Particle Size of Pulverized Product)

As a particle size of a pulverized product of the present invention, the weight average particle diameter (D50) is preferably 200 to 600 μm, more preferably 200 to 550 μm, still more preferably 250 to 500 μm, and particularly preferably 300 to 500 μm. Furthermore, the ratio of particles having a particle diameter of less than 150 μm is, relative to whole water absorbent resin powder, preferably 0 to 30% by weight, more preferably 0 to 25% by weight, still more preferably 0 to 20% by weight, and particularly preferably 0 to 15% by weight. The ratio of particles having a particle diameter of 850 μm or more is preferably 0 to 8% by weight, more preferably 0 to 5% by weight, still more preferably 0 to 4% by weight, and particularly preferably 0 to 3% by weight. Furthermore, logarithmic standard deviation ($\sigma\zeta$) of particle diameter distribution is preferably 0.20 to 0.62, more preferably 0.25 to 0.60, and still more preferably 0.27 to 0.58. Meanwhile, the particle size is measured using a standard sieve based on the measurement method described in US 2006/0204755 A or EDANA ERT420.2-02.

(Particle Size of Water Absorbent Resin Powder)

As a particle size of water absorbent resin powder of the present invention, the weight average particle diameter (D50) is preferably 200 to 600 μm, more preferably 200 to 550 μm, still more preferably 250 to 500 μm, and particularly preferably 350 to 450 μm. Furthermore, the ratio of particles having a particle diameter of less than 150 μm is preferably 0 to 10% by weight, more preferably 0 to 5% by weight, and still more preferably 0 to 1% by weight. The ratio of particles having a particle diameter of 850 μm or more is preferably 0 to 5% by weight, more preferably 0 to 3% by weight, and still more preferably 0 to 1% by weight.

Furthermore, logarithmic standard deviation ($\sigma\zeta$) of particle diameter distribution is preferably 0.20 to 0.50, more preferably 0.25 to 0.40, and still more preferably 0.27 to 0.35. Meanwhile, the particle size is measured using a standard sieve based on the measurement method described in US 2006/0204755 A or EDANA ERT420.2-02.

The aforementioned particle size is applied not only to the water absorbent resin after surface cross-linking (hereinbelow, it may be referred to as "water absorbent resin particle" for the sake of convenience) but also to a water absorbent resin as a final product. For such reasons, the water absorbent resin particle is preferably subjected to a surface cross-linking treatment to maintain the particle size within the aforementioned range.

(Water Absorbent Resin Suitable for Production Method of the Present Invention (First Method to Fifth Methods))

The present invention is particularly preferred for producing a water absorbent resin with high liquid permeability (in particular, SFC) in which the particle size distribution is important (preferred SFC range is in the following (3-3)) and a water absorbent resin having high water absorbent speed (in particular, FSR) in which fine powder may be easily generated during a pulverizing step (preferred FSR range is in the following (3-7)). Namely, the production method of the present invention is preferably applied for producing a water absorbent resin having high liquid permeability and high water absorbent speed. Thus, the water absorbent resin powder preferred in the present invention has saline flow conductivity (SFC) of 10 ($\times 10^{-7} \cdot cm^3 \cdot s \cdot g^{-1}$) or higher and water absorbent speed (FSR) of 0.20 (g/g/s) or more, and more preferably 0.36 (g/g/s) or more. Furthermore, it preferably satisfies the following (3-3) and (3-7).

(2-6) Surface Cross-Linking Step

This step is a step for forming an area with higher cross-linking density on a surface layer (several tens of micrometers from the surface of a water absorption resin powder) of a water absorbent resin powder which is obtained after the aforementioned steps, and it includes a mixing step for obtaining a mixture by mixing water absorbent resin powder and a solution of surface cross-linking agent, a heat treatment step for heating the mixture, and, if necessary, a cooling step for performing cooling.

According to the surface cross-linking step, a water absorbent resin (water absorbent resin particles) with a surface cross-linked by radical cross-linking or surface polymerization on surface of water absorbent resin powder, by a cross-linking reaction with a surface cross-linking agent, or the like is obtained.

(Surface Cross-Linking Agent)

Examples of the surface cross-linking agent which may be used in the present invention include, although not particularly limited, various organic or inorganic surface cross-linking agents. Among them, from the viewpoint of physical properties of a water absorbent resin or handling property of a surface cross-linking agent, an organic surface cross-linking agent capable of forming a covalent bond according to a reaction with a carboxy group can be preferably mentioned. More specifically, one or two or more surface cross-linking agents that are described in column 9 and 10 of U.S. Pat. No. 7,183,456 and, if necessary, a hydrophilic organic solvent, can be applied for the present invention. The total use amount of the surface cross-linking agent is, relative to 100 parts by weight of water absorbent resin powder, preferably 0.01 to 10 parts by weight, and more preferably 0.01 to 5 parts by weight. It is also preferable to use water when the surface cross-linking agent is added, and it is preferable to add the surface cross-linking agent as an aqueous solution. The use amount of water is, relative to 100 parts by weight of water absorbent resin powder, preferably 0.1 to 20 parts by weight, and more preferably 0.5 to 10 parts by weight. When a hydrophilic organic solvent is used, if necessary, the use amount is, relative to 100 parts by weight of water absorbent resin powder, preferably 10 parts by weight or less, and more preferably 5 parts by weight or less. In addition to the aforementioned surface cross-linking agent (aqueous solution), additives that are used for the following "remoistening (other name; re-wetting) step" can be mixed with the surface cross-linking agent (aqueous solution) or added to this step separately, each within a range of 5 parts by weight or less.

(Mixing Step)

According to the present invention, a method of adding and mixing the surface cross-linking agent solution in the surface cross-linking step is not limited, however, a surface cross-linking agent, water as a solvent, if needed, a hydrophilic organic solvent, or a mixture of them is prepared in advance, and the prepared solvent is then added to and mixed with the water absorbent resin powder preferably by being sprayed or dropped onto the water absorbent resin powder, and more preferably added to and mixed with the water absorbent resin powder by being sprayed onto the resin powder.

Furthermore, the mixer device, which is used to mix the surface cross-linking agent solution with the water absorbent resin powder, is not particularly limited, and is preferably a high-speed stirring mixer, and more preferably a high-speed stirring continuous mixer.

(Heat Treatment Step)

The water absorbent resin powder, which has been added and mixed with the surface cross-linking agent solution, is subjected to a heat treatment, and then is subjected to cool treatment if needed. For heating, a known dryer can be applied, and it is preferably a paddle dryer. The heating temperature is preferably 80 to 250° C., and more preferably 100 to 220° C.

(2-7) Remoistening Step

This step is a step for adding at least one additive, which is selected from the group consisting of a polyvalent metal salt compound, a polycationic polymer, a chelating agent, an inorganic reducing agent, and a hydroxycarboxylic compound which are described later, to the water absorbent resin particles obtained in the surface cross-linking step.

The additive is preferably added in the form of aqueous solution or slurry liquid. In this case, the water absorbent resin is swollen again in water, and therefore this step is referred to as "remoistening step". Note that the additive may be added and mixed concurrently with the surface cross-linking agent solution described above. It is preferably controlled to the later described moisture content (3-4), and particularly preferably controlled to a moisture content of 2 to 9% by weight.

(Polyvalent Metal Salt and/or Cationic Polymer)

In the present invention, from the viewpoint of improving water absorbent speed (vortex), improving liquid permeability (SFC), fluidity during water absorption, or the like of a water absorbent resin to be obtained, it is preferable to add a polyvalent metal salt and/or a cationic polymer.

Specifically, the polyvalent metal salt and/or cationic polymer that are described in "[6] Polyvalent metal salt and/or cationic polymer" in WO 2011/040530 A, and their use amount are applied to the present invention.

(Chelating Agent)

In the present invention, from the viewpoint of preventing coloration or preventing deterioration of a water absorbent resin to be obtained, a chelating agent can be further added.

As for the chelating agent, the chelating agent described in, for example, "[2] Chelating agent" in WO 2011/040530 A, and the use amount can be applied to the present invention.

(Inorganic Reducing Agent)

In the present invention, from the viewpoint of preventing coloration or preventing deterioration of a water absorbent resin to be obtained, or reducing residual monomers, an inorganic reducing agent can be further added.

As for the inorganic reducing agent, the inorganic reducing agent described in, for example, "[3] Inorganic reducing agent" in WO 2011/040530 A, and the use amount can be applied to the present invention.

(α-Hydroxycarboxylic Acid Compound)

In the present invention, from the viewpoint of preventing coloration of a water absorbent resin to be obtained, an α-hydroxycarboxylic acid compound can be further added. Meanwhile, the "α-hydroxycarboxylic acid compound" means carboxylic acid which has a hydroxyl group in the molecule, or a salt thereof, and it is hydroxycarboxylic acid which has a hydroxyl group at a position.

As for the α-hydroxycarboxylic acid compound, the α-hydroxycarboxylic acid compound described in, for example, "[6] α-Hydroxycarboxylic acid compound" in WO 2011/040530 A, and the use amount can be applied to the present invention.

(Water Insoluble Powder)

For the liquid permeability or an anti-caking property, water insoluble powder, in particular, water insoluble inorganic powder can be used. Representative examples thereof include silica ($SiO_2$), alumina, titaniumoxide, clay, kaolin, and the like.

(2-8) Step for Adding Other Additives

In order to give various functions to a water absorbent resin, it is possible to add an additive other than the above-described additives. Specifically, examples of such an additive include a surface active agent, a compound having a phosphorus atom, an oxidizing agent, an organic reducing agent, water insoluble inorganic fine particle described in "[5] Water insoluble inorganic fine particles" in WO 2011/040530 A, organic powder such as metal soap, a deodorant agent, an antibacterial agent, pulp, thermoplastic fiber, and the like. Further, as the surface active agent, a surface active agent disclosed in US 2005/0209352 A can be preferably used.

The use amount of these additives is determined as appropriate in accordance with the purpose of use and is not particularly limited. However, it is preferably 0 to 3% by weight, and more preferably 0 to 1% by weight.

(2-9) Other Steps

In addition to the above-described steps, it is possible to carry out, if needed, steps such as a granulation step, a sizing step, a fine powder removing step, and a recycling step for fine powder. Moreover, it is possible to further carry out one or more of steps such as a transporting step, a storing step, a packaging step, and a reserving step. As described herein, the sizing step includes a fine powder removing step after the surface cross-linking step and a step for performing classification and pulverization when the water absorbent resin is aggregated to yield a larger size than desired. Further, the recycling step for fine powder includes a step of adding, to any step of the process for producing the water absorbent resin, the fine powder by itself or after being prepared as large hydrogel during fine powder granulation step.

[3] PHYSICAL PROPERTIES OF POLYACRYLIC ACID (SALT)-BASED WATER ABSORBENT RESIN

Regarding the water absorbent resin of the present invention, when it is used in hygiene product, in particular, in a disposable diaper, it is preferable that at least one of the following physical properties (3-1) through (3-11), preferably at least two, and more preferably at least three of the following physical properties (3-1) through (3-11) including water absorption capacity under load (AAP) be controlled to fall within intended ranges. In a case in which the physical properties do not satisfy the following ranges, the effect of the present invention is not obtained at sufficient level so that sufficient performance of a high concentration disposable diaper may not be exhibited.

Furthermore, the water absorbent resin, which is obtained with the manufacturing method in accordance with the present invention, is not limited to a particular shape, and is particularly preferably particulated. The following description will discuss physical properties of particulated water absorbent resin, in accordance with a preferable aspect. Note that the following physical properties are defined in conformity to the EDANA method, unless specifically otherwise noted.

(3-1) Water Absorption Capacity without Load (CRC)

A water absorption capacity without load (CRC) of the water absorbent resin in accordance with the present invention is preferably 5 (g/g) or higher, more preferably 15 (g/g) or higher, and still more preferably 25 (g/g) or higher. An upper limit is not particularly limited and is preferably 70 (g/g) or lower, more preferably 50 (g/g) or lower, and still more preferably 40 (g/g) or lower from the viewpoint of a balance with other physical properties.

In a case in which the CRC is lower than 5 (g/g), the absorption amount is low and it is not suitable for an absorbent body of hygiene product such as a disposable diaper. In a case in which the CRC is more than 70 (g/g), a speed of absorbing, for example, a body fluid such as urine or blood is decreased, and thus it is not suitable for use in a disposable diaper or the like of high water absorbent speed type. Note that the CRC can be controlled with the use of an agent such as an internal cross-linking agent or a surface cross-linking agent.

(3-2) Water Absorption Capacity Under Load (AAP)

A water absorption capacity under load (AAP) of the water absorbent resin in accordance with the present invention is preferably 20 (g/g) or higher, more preferably 21 (g/g) or higher, still more preferably 22 (g/g) or higher, and particularly preferably 23 (g/g) or higher. The upper limit is not particularly limited, but from the viewpoint of a balance with other physical properties, it is preferably 30 (g/g) or lower.

In a case in which the AAP is lower than 20 (g/g), an amount of liquid returned (hereinafter, generally referred to as "re-wet") when a pressure is exerted on the absorbent body becomes large, and such an absorbent body is not suitable for hygiene product such as a disposable diaper. Meanwhile, the AAP can be controlled by adjusting particle size, by the use of a surface cross-linking agent, or the like.

(3-3) Saline Flow Conductivity (SFC)

A saline flow conductivity (SFC) of the water absorbent resin in accordance with the present invention is preferably 10 ($\times 10^{-7} \cdot s \cdot cm^3 \cdot g^{-1}$) or higher, more preferably 50 ($\times 10^{-7} \cdot s \cdot cm^3 \cdot g^{-1}$) or higher, still more preferably 60 ($\times 10^{-7} \cdot s \cdot cm^3 \cdot g^{-1}$) or higher, particularly preferably 70 ($\times 10^{-7} \cdot s \cdot cm^3 \cdot g^{-1}$) or higher, and most preferably 80 ($\times 10^{-7} \cdot s \cdot cm^3 \cdot g^{-1}$) or higher. The upper limit is not particularly limited, but it is preferably 3000 ($\times 10^{-7} \cdot s \cdot cm^3 \cdot g^{-1}$) or lower, and more preferably 2000 ($\times 10^{-7} \cdot s \cdot cm^3 \cdot g^{-1}$) or lower.

In a case in which the SFC is lower than 10 ($\times 10^{-7} \cdot s \cdot cm^3 \cdot g^{-1}$), a liquid permeability relative to, for example, a body fluid such as urine and blood is low, and therefore it is not suitable for use in a disposable diaper or the like which has an absorbent body containing a large use amount of water absorbent resin. In a case in which the SFC is higher than 3000 ($\times 10^{-7} \cdot s \cdot cm^3 \cdot g^{-1}$), for example, a body fluid such as urine and blood may not be sufficiently absorbed and may leak. Therefore, such a water absorbent resin is not suitable for use in a disposable diaper or the like. Meanwhile, the SFC can be controlled by adjusting particle size or by the use of, for example, a surface cross-linking agent, a polyvalent metal salt, a cationic polymer, or the like.

(3-4) Moisture Content

A moisture content of the water absorbent resin in accordance with the present invention is preferably more than 0% by weight and 15% by weight or lower, more preferably 1 to 13% by weight, still more preferably 2 to 10% by weight, and particularly preferably 2 to 9% by weight. By controlling the moisture content to fall within the above described range, it is possible to obtain the water absorbent resin which is excellent in powder characteristic (for example, fluidity, transportability, damage resistance, and the like).

(3-5) Residual Monomer

From the viewpoint of safety, a residual monomer in the water absorbent resin of the present invention is preferably 0 to 500 ppm, more preferably 0 to 400 ppm, and still more preferably 0 to 300 ppm. By controlling the residual monomer to fall within the above described range, it is possible to obtain the water absorbent resin which is less stimulating to, for example, the skin.

(3-6) Water Soluble Component (Ext)

A water soluble component (Ext) of the water absorbent resin in accordance with the present invention is preferably 35% by weight or less, more preferably 25% by weight or less, and still more preferably 15% by weight or less.

In a case in which the water soluble component is higher than 35% by weight, a gel strength is low and therefore the liquid permeability of the water absorbent resin may be deteriorated. Further, the re-wet is increased, and therefore such a water absorbent resin is not suitable for use in a disposable diaper or the like. Meanwhile, the water soluble component can be controlled with the use of an internal cross-linking agent or the like.

(3-7) Water Absorbent Speed (FSR)

The water absorbent speed (FSR) of the water absorbent resin of the present invention is preferably 0.10 (g/g/s) or higher, more preferably 0.15 (g/g/s) or higher, still more preferably 0.20 (g/g/s) or higher, particularly preferably 0.25 (g/g/s) or higher, and most preferably 0.36 (g/g/s) or higher. The upper limit is preferably 5.0 (g/g/s) or lower, and more preferably 4.0 (g/g/s) or lower, although it is not particularly limited thereto.

In a case in which the water absorbent speed (FSR) is lower than 0.10 (g/g/s), for example, a body fluid such as urine and blood may not be sufficiently absorbed and may leak. Therefore, it is not suitable for use in a disposable diaper or the like. Meanwhile, the FSR can be controlled, for example, by foaming polymerization or by adjusting particle size.

(3-8) Particle Size

The particle size (particle diameter distribution weight average particle diameter (D50) and logarithmic standard deviation of particle diameter distribution ($\sigma\zeta$)) of the water absorbent resin of the present invention are controlled such that it is the same as the particle size in the aforementioned range.

(3-9) Initial Color Hue

An initial color hue of the water absorbent resin of the present invention has (as defined by Hunter's Lab color system) an L value of preferably 88 or more, more preferably 89 or more, and still more preferably 90 or more. The upper limit is 100, and no problem occurs due to initial color hue, provided that the L value is 88 or more. Moreover, an a value is in a range of preferably −3 to 3, more preferably −2 to 2, and still more preferably −1 to 1. Moreover, a b value is in a range of preferably 0 to 12, more preferably 0 to 10, and still more preferably 0 to 9. Meanwhile, as the L value approaches 100, whiteness is increased, and as the a value and the b value approach 0, the coloration is low and the color becomes substantially white.

(3-10) Color Hue with the Lapse of Time

A color hue with the lapse of time of the water absorbent resin of the present invention has (as defined by the Hunter's Lab color system) an L value of preferably 80 or more, more preferably 81 or more, still more preferably 82 or more, and particularly preferably 83 or more. An upper limit is 100, and no problem occurs due to color hue with the lapse of time, provided that the L value is 80 or more. Moreover, an a value is in a range of preferably −3 to 3, more preferably −2 to 2, and still more preferably −1 to 1. Moreover, a b value is in a range of preferably 0 to 15, more preferably 0 to 12, and still more preferably 0 to 10. Meanwhile, as the L value approaches 100, whiteness is increased, and as the a value and the b value approach 0, the coloration is low and the color becomes substantially white.

(3-11) Internal Gas Bubble Ratio

An internal gas bubble ratio of the water absorbent resin of the present invention (as defined in Examples) is preferably 1.0 to 4.0%, more preferably 1.2 to 3.8%, and still more preferably 1.4 to 3.6%. In a case in which the internal gas bubble ratio is less than 1.0%, the effect of increasing the water absorbent speed (FSR) is lowered, and therefore undesirable. On the other hand, in a case in which the internal gas bubble ratio is more than 4.0%, the liquid permeability (SFC) is lowered in conjunction with a decrease in anti-damage property, and therefore undesirable.

[4] USE OF POLYACRYLIC ACID (SALT)-BASED WATER ABSORBENT RESIN

The use of the water absorbent resin of the present invention is not particularly limited, and the water absorbent resin can preferably be used as an absorbent body of hygiene product such as a disposable diaper, a sanitary napkin, and an incontinence pad. In particular, the water absorbent resin of the present invention can be used as an absorbent body of a high concentration disposable diaper (in which a large use amount of water absorbent resin is contained in one disposable diaper) that conventionally had a problem such as an odor derived from a raw material and coloration. Further, in a case in which the water absorbent resin of the present invention is used in an upper layer part of the absorbent body, it is possible to have remarkable effects.

Moreover, as an absorbent body, a water absorbent material such as pulp fibers can be used in addition to the water absorbent resin. In this case, a content of the water absorbent resin (core concentration) in the absorbent body is preferably 30 to 100% by weight, more preferably 40 to 100% by weight, still more preferably 50 to 100% by weight, further still more preferably 60 to 100% by weight, particularly preferably 70 to 100% by weight, and most preferably 75 to 95% by weight.

By controlling the core concentration to fall within the above described range, in a case in which the absorbent body is used as an upper layer part of an absorbent article, the absorbent article can maintain a white state with fresh feel. Further, such an absorbent body is excellent in diffusion property with respect to, for example, a body fluid such as urine and blood, and it is therefore expected to have an increased absorption amount by efficient liquid distribution.

EXAMPLES

Hereinbelow, the present invention (the first to the fifth methods) is described more specifically in view of Examples. However, the present invention is not limited to Examples shown below, and a combination of technical means disclosed in each example is also encompassed in the technical scope of the present invention.

Various physical properties that are described in Claims or Examples of the present invention were obtained by the method for measuring physical properties described below. Meanwhile, unless specifically described otherwise, the power source of an electric apparatus used in Examples was 200 V or 100 V, and various physical properties of the water absorbent resin of the present invention were measured at conditions including room temperature (in a range of 20° C. to 25° C.) and a relative humidity of 50% RH. Furthermore, "liter" may be abbreviated as "l" or "L", and "% by weight" may be abbreviated as "wt %" in Examples for the sake of convenience. Moreover, the measurement was made by ERT (EDANA method), unless specifically described otherwise.

[Measurement of Physical Properties of Water Absorbent Resin]

(a) Particle Size (Particle Diameter Distribution•Weight Average Particle Diameter (D50)•Logarithmic Standard Deviation of Particle Diameter Distribution ($\sigma\zeta$))

The sieve particle size distribution (PSD), the weight average particle diameter (D50), and a particle diameter distribution width of the water absorbent resin of the present invention were measured in the same manner as disclosed in the specification of U.S. Pat. No. 7,638,570, columns 27 and 28 "(3) Mass-Average Particle Diameter (D50) and Logarithmic Standard Deviation ($\sigma\zeta$) of Particle Diameter Distribution".

Meanwhile, for the dried polymer (non-pulverized product), reference is made to "Particle diameter distribution of dried product" described in the pamphlet of WO 2010/114058 A. Furthermore, for the particle diameter distribution of particles during pulverization, which are obtained by pulverization with at least second- or following stages, approximately ten sieves for measuring particle size described in the specification of US 2006/204755 A or the pamphlet of WO 2010/114058 A were suitably combined and used for measurement.

(b) Water Absorption Capacity without Load (CRC)

CRC (water absorption capacity without load) of the water absorbent resin of the present invention was measured in accordance with EDANA method (ERT442.1-02).

(c) Water Absorption Capacity Under Load (AAP)

AAP (absorption against pressure) of the water absorbent resin of the present invention was measured in accordance with EDANA method (ERT442.2-02). Meanwhile, the load condition was changed to 4.83 kPa (0.7 psi).

(d) Saline Flow Conductivity (SFC)

SFC (saline flow conductivity) of the water absorbent resin of the present invention was measured in accordance with the descriptions in U.S. Pat. No. 5,669,894 (Patent Literature 29).

(e) Moisture Content and Concentration of Solid Content

A moisture content of the water absorbent resin of the present invention was measured in accordance with EDANA method (ERT430.2-02). Meanwhile, the sample amount was changed to 1 g and the drying temperature was changed to 180° C.

Furthermore, for measuring the moisture content of a dried polymer, in particular a dried polymer right before pulverization by a roll mill, as a pretreatment, a polymer pulverized by a laboratory-level pulverizer, specifically, a polymer pulverized by a laboratory pulverizer or a personal mill (manufactured by SIBATA SCIENTIFIC TECHNOLOGY LTD.) until the particles with particle diameter of at least 850 μm are less than 10% by weight (in particular, a weight average particle diameter (D50) of 350 to 450 μm) can be used for measurement of moisture content.

Furthermore, the concentration of solid content is defined by "100–the moisture content" (% by weight).

(f) Absorption Speed (FSR)

FSR (Free Swelling Rate) of the water absorbent resin of the present invention was measured in accordance to the descriptions of US 2010/0184594 A.

(g) Internal Gas Bubbles Ratio

Internal gas bubbles ratio of the water absorbent resin of the present invention was measured in accordance with the descriptions of US 2012/0258851 A.

(h) Roll Clearance

In the present invention, roll clearance was measured in accordance with JIS by using a gap gauge defined by JIS B 7524 (2008). The gap gauge was a gap gauge allowing measurement at every 10 μm, and it has leaf width: 12.7 mm, leaf shape: A, and leaf length; 100 mm or 150 mm. Meanwhile, "thickness, width, length, permissible warpage deviation", "material, surface roughness" of the leaf, "measurement temperature" or the like are based on JIS standard. Among them, the gap gauge according to JIS 100A12, 150A12 and the like is preferably used. Other than those, a JIS standard product or an equivalent thereof like A10, A13, A19, and A25 can be suitably selected depending on roll clearance or roll diameter and used for the measurement.

Production Example 1

(Polymerization Step)

First, as the monomer aqueous solution (1), an aqueous solution of partially neutralized sodium acrylate with a neutralization rate of 73% by mol and a monomer concentration of 43% by weight was prepared. At that time, 0.09% by mol (relative to monomer) polyethylene glycol diacrylate (average molecular weight of 523) as an internal cross-linking agent and 100 ppm (relative to monomer) tetrasodium diethylenetriamine pentaacetate as a chelating agent were added to the monomer aqueous solution (1).

Next, the monomer aqueous solution (1) was supplied (liquid transport) continuously to a polymerization apparatus by using a liquid transport pump. At that time, by continuously blowing nitrogen gas from the middle of the liquid transport pipe, the dissolved oxygen concentration in the monomer aqueous solution (1) was adjusted to 0.5 ppm (0.5 mg/l) or less. Subsequently, after increasing the temperature of the monomer aqueous solution (1) to 95° C., sodium persulfate as a polymerization initiator was continuously mixed therein (line mixing). Meanwhile, the addition amount of sodium persulfate was 0.12 g (0.05% by mol) per mol of the monomer.

The liquid supplied to the polymerization apparatus was polymerized while it was boiled on a flat steel belt. The polymerization time is about 3 minutes. With this operation, a sheet-like water-containing gel-like crosslinked polymer (hydrogel) (1) was obtained. Meanwhile, the polymerization apparatus was a flat steel belt polymerization apparatus which has an embankment at both ends. The flat steel belt was coated with polytetrafluoroethylene (PFA).

(Gel Crushing Step)

Next, after being cut at the same interval in a direction perpendicular to the advancing direction of the flat steel belt, the sheet-like hydrogel (1) (surface temperature of about 80° C.) was subjected to micronization (gel crushing) according to continuous feeding into a meat chopper with hole diameter of 22 mm. At that time, 7 parts by weight of hot water at 80° C. were added to 100 parts by weight of the hydrogel (1). With this operation, the particulated hydrogel (1) in which the weight average particle diameter (D50) is 1.1 mm, logarithmic standard deviation (σζ) of particle diameter distribution is 1.7, and solid content is 49% by weight was obtained.

(Drying Step)

Subsequently, the particulate hydrogel (1) was continuously loaded on a porous plate of a continuous through-flow belt-type dryer by using a traverse feeder. It was then dried by blowing hot air at 170° C. for 38 minutes.

This continuous through-flow belt-type dryer has a structure in which same-sized seven drying rooms are present, and the control was made such that hot air was blown in upward direction at wind speed of 1.6 (m/s) in the first room while it was blown in downward direction at wind speed of 1.0 (m/s) in the second to the sixth rooms. Meanwhile, in the seventh room at the end of a dryer, the dried polymer was forcefully cooled by blowing hot air at 60° C., and the temperature was 100° C. or less. Meanwhile, dew point of the hot air was 71° C.

According to the aforementioned operation, the dried polymer was obtained as the dried polymer (1) having fluidity according to disintegration (coarse crushing) using a crusher equipped with several pins on rotation axis, although it was in block state due to loose aggregation at a dryer exit.

The dried polymer (1) has a weight average particle diameter (D50) of 2.6 mm, logarithmic standard deviation (σζ) of particle diameter distribution of 0.80, and solid content of 95% by weight.

(Storing Step)

The dried polymer (1) was transported by using a bucket conveyor and added into a hopper. The hopper and the transport pipe have been heated by steam trace, and the temperature of the dried polymer (1) in the hopper was about 60° C. In the hopper, the dried polymer was holded for 15 minutes on average or so.

Comparative Example 1

(Pulverizing Step)

The dried polymer (1) obtained from Production Example 1 was discharged at 600 (kg/hr) from the bottom of hopper by using a quantitative feeder. After that, it was dropped into a stainless pipe with pipe diameter of 10 cm so that the dried polymer (1) is added to a center part of a roll mill followed by pulverization.

Specifications and operation conditions of the roll mill are as follows. The specifications include; roll length: 60 cm, roll diameter: 30 cm, roll material:

centrifugal chilled cast iron, inside wall of roll mill: SUS304 buff finishing, roll surface: grooves having an angle of 3° relative to rotation axis of a roll are present, inclination of grooves is in the same direction for a pair of rolls, and the operation conditions include: roll rotation number: 220 rpm and 500 rpm (a pair of rolls has different speed, peripheral speed ratio is 1:2.27), roll clearance: 0.4 mm, roll mill temperature: about 60° C., atmospheric temperature within the roll mill: about 60° C., atmospheric dew point within the roll mill: about 11° C. (relative humidity of 7% RH), temperature of the dried polymer (1): 60° C., and reduced pressure within the roll mill and adjacent pipes: 0.1 kPa. Meanwhile, the minimum value of roll clearance relative to the weight average particle diameter of a pulverized product (Gap/D50) was 0.8 (=0.4/0.48).

Meanwhile, since the roll mill was used right after the maintenance, the width of roll clearance change was substantially 0 μm (less than 10 μm) and the degree of roll clearance change was also substantially 0%.

With regard to the dried polymer (1) which is added to the roll mill, the roll length was divided into three identical parts and the flow amount (supply amount) of the dried polymer (1) was measured for each part. As a result, it was found to be 100% by weight at the center part. Specifically, the entire amount of the dried polymer (1) was added to the center part of the roll mill. Meanwhile, the feed width ratio was 30%.

Meanwhile, the comparative pulverized product (a1) was obtained by the above operation. The obtained comparative pulverized product (a1) was sampled, and particle size was measured. The results are shown in Table 1.

(Classification Step)

Subsequently, the entire amount of the comparative pulverized product (a1) was continuously supplied to a classification device (1) (classification device consisting of a metal sieve with a mesh size of 850 μm/150 μm in order from top to bottom/manufactured by MINOX; sieve diameter 600 mm) for classification.

According to this operation, particles present between a sieve with a mesh size of 850 μm and a sieve with a mesh size of 150 μm were obtained as the comparative water absorbent resin powder (1) and particles passed through a sieve with a mesh size of 150 μm were obtained as the comparative water absorbent resin fine powder (1). As a result of measuring the particle diameter distribution of the comparative water absorbent resin powder (1), it was found that particles less than 150 μm were contained at 1.3% by weight.

(Surface Cross-Linking Step)

Next, after preparing the comparative surface cross-linking agent solution (1) consisting of 0.5 part by weight of ethylene carbonate and 3 parts by weight of pure water for industrial use, it was added to 100 parts by weight of the comparative water absorbent resin powder (1) by spraying in a high speed mixer (turbulizer/1000 rpm; manufactured by Hosokawa Micron). After that, it was transferred to a paddle dryer and subjected to a heat treatment at 198° C. (temperature of heating medium) for 35 minutes.

After the heat treatment, forced cooling was performed by using a paddle type cooler until the temperature of the surface crosslinked comparative water absorbent resin powder (1) becomes 60° C.

(Remoistening Step)

During the cooling, a treatment agent consisting of 0.3 part by weight of aluminum sulfate, 1 part by weight of water, and 0.03 part by weight of propylene glycol was added to 100 parts by weight of the surface crosslinked comparative water absorbent resin powder (1).

(Sizing Step) Subsequently, the comparative water absorbent resin powder (1) after the surface treatment was classified by using the classification device (2) equipped with a JIS standard sieve with a mesh size of 850 μm, and it was pulverized by a flash mill until the pass though of the total amount of the powder. According to this operation, the comparative water absorbent resin (p1) with a particle diameter of less than 850 μm was obtained. Physical properties of the comparative water absorbent resin (p1) are shown in Table 1.

Example 1

The pulverized product (A1) and the water absorbent resin (P1) were obtained by performing the same operations as Comparative Example 1 except that the rotary type dispersing device of a screw type feeder which is shown in FIG. 1 and FIG. 2 is used at the entrance of (right above) the roll mill in Comparative Example 1. The particle size of the obtained pulverized product (A1) and physical properties of the water absorbent resin (P1) are shown in Table 1.

Meanwhile, according to the screw feeder type dispersing device, blades are rotated so as to transfer the dried polymer (1) from the center part to both ends of the roll mill.

With regard to the dried polymer (1) which is added to the roll mill, the roll length was divided into three identical parts and the flow amount (supply amount) of the dried polymer (1) was measured for each part. As a result, it was found to be 40% by weight at the center part and 30% by weight for each end. Namely, the dried polymer (1) was added to almost entire part of the roll mill. Meanwhile, the length of the screw feeder type dispersing device was 90% of the roll length and the feed width ratio was 95%. When the roll was divided into three identical parts in axial direction of a roll, the region with highest supply amount of the dried polymer was 1.3 times the region with the lowest supply amount.

Example 2

The pulverized product (A2) and the water absorbent resin (P2) were obtained by performing the same operations as Comparative Example 1 except that the slit type dispersing device shown in FIG. 3 is used at the entrance of (right above) the roll mill in Comparative Example 1 and the pulverization is started after increasing the storage amount in a hopper until the entire slit is covered with the dried polymer (1). The particle size of the obtained pulverized product (A2) and physical properties of the water absorbent resin (P2) are shown in Table 1.

Meanwhile, the slit type dispersing device consists of a slit having almost the same length as roll length, a roll-shape feeder for discharging the dried polymer from the slit, and a hopper installed with a knocker.

With regard to the dried polymer (1) which is added to the roll mill, the roll length was divided into three identical parts and the flow amount (supply amount) of the dried polymer (1) was measured for each part. As a result, it was found that almost the same amount is present at the center part and both ends. In other words, as the dried polymer (1) was added almost evenly to the entire roll mill, when the roll was divided into three identical parts in axial direction, the region with highest supply amount of the dried polymer was 1.0 times the region with the lowest supply amount. Meanwhile, since the dried polymer (1) falls, from the slit type dispersing device, with a width close to the roll length, the feed width ratio is almost 100%. Furthermore, although bridge has been sometimes shown in the hopper during operation period, it was resolved by a knocker.

Example 3

The pulverized product (A3) and the water absorbent resin (P3) were obtained by performing the same operations as Comparative Example 1 except that three mountain-like dispersing plates (with an angle of 60°) were installed at the entrance of (right above) the roll mill in Comparative Example 1. The particle size of the obtained pulverized product (A3) and physical properties of the water absorbent resin (P3) are shown in Table 1.

Meanwhile, the mountain-like dispersing plate has a function of dividing the falling dried polymer (1) into two parts, that is, in two directions of left and right of the mountain. In Example 3, one mountain-like dispersing plate was installed at the first stage from the top and two plates were installed at the second stage. Accordingly, with regard to the dried polymer (1) which is added to the roll mill, the roll length was divided into three identical parts and the flow amount (supply amount) of the dried polymer (1) was measured for each part. As a result, it was found to be 50% by weight at the center part and 25% by weight for each end. Namely, when the roll was divided into three identical parts in axial direction of a roll, the region with highest supply amount of the dried polymer was 2 times the region with the lowest supply amount. Meanwhile the feed width ratio was 90%.

Comparative Example 2

The comparative pulverized product (a2) and the comparative water absorbent resin (p2) were obtained by performing the same operations as Comparative Example 1 except that the tube diameter of the stainless pipe in Comparative Example 1 is changed to 20 cm. The particle size of the obtained comparative pulverized product (a2) and physical properties of the comparative water absorbent resin (p2) are shown in Table 1.

With regard to the dried polymer (1) which is added to the roll mill, the roll length was divided into three identical parts and the flow amount (supply amount) of the dried polymer (1) was measured for each part. As a result, it was found to be 94% by weight at the center part and 3% by weight for each end. Namely, when the roll was divided into three identical parts in axial direction of a roll, the region with highest supply amount of the dried polymer was 31 times the region with the lowest supply amount. Meanwhile the feed width ratio was 50%.

Example 4

The pulverized product (A4) and the water absorbent resin (P4) were obtained by performing the same operations as Example 1 except that the following (fine powder recycling step) is added to Example 1. The particle size of the obtained pulverized product (A4) and physical properties of the water absorbent resin (P4) are shown in Table 1.

(Fine Powder Recycling Step)

For performing fine powder granulation, 120 parts by weight of pure water for industrial use were added to 100 parts by weight of the water absorbent resin fine powder (4), which has been obtained from a classification step, by spraying in a high speed mixer which is different from that of the surface cross-linking step (turbulizer/1000 rpm; manufactured by Hosokawa Micron). After adding the granulated gel derived from the water absorbent resin fine powder (4), which is obtained by this operation, to the particulated hydrogel (1) which has been obtained from the aforementioned gel crushing step, the drying step or the like that are described above was performed.

Comparative Example 3

The comparative pulverized product (a3) and the comparative water absorbent resin (p3) were obtained by performing the same operation as Comparative Example 1 except that the above (fine powder recycling step) is added to Comparative Example 1. The particle size of the obtained comparative pulverized product (a3) and physical properties of the water absorbent resin (p3) are shown in Table 1.

Example 5

The pulverized product (A5) and the water absorbent resin (P5) were obtained by performing the same operations as Example 1 except that, at the underpart of a roll mill (first stage), two roll mills are connected to each other vertically such that they are parallel to the roll mill at the first stage (they were referred to as the second-stage roll mill and third-stage roll mill from the upper) and the specifications are changed as follows in Example 4. The particle size of the obtained pulverized product (A5) and physical properties of the water absorbent resin (P5) are shown in Table 1.

Meanwhile, no dispersing device was installed between the first-stage roll mill and the second-stage roll mill, and the second-stage roll mill and the third-stage roll mill. However, as each of the pulverized product from the first-stage roll mill and the pulverized product from the second-stage roll mill is discharged with roll width, it is supplied with its own width to the second-stage roll mill and the third-stage roll mill.

Furthermore, the change point of the roll mill specifications is as follows. For the first roll mill, roll clearance: 0.7 mm. For the second roll mill, roll clearance: 0.4 mm. For the third roll mill, roll clearance: 0.2 mm.

Comparative Example 4

The comparative pulverized product (a4) and the comparative water absorbent resin (p4) were obtained by performing the same operations as Example 5 except that the rotary type (screw type feeder) dispersing device of Example 5 is not used. The particle size of the obtained comparative pulverized product (a4) and physical properties of the water absorbent resin (p4) are shown in Table 1.

Example 6

The pulverized product (A6) and the water absorbent resin (P6) were obtained by performing the same operations as Example 5 except that the following (Classification step before pulverizing) is added to Example 5. The particle size of the obtained pulverized product (A6) and physical properties of the water absorbent resin (P6) are shown in Table 1.

(Classification Step Before Pulverizing)

The dried polymer in a block state due to loose aggregation at a dryer exit in the aforementioned drying step was disintegrated using a crusher equipped with several pins present on rotation axis. After that, by supplying it to the classification device (0) having sieves with a mesh size of 10 mm, 850 µm, and 150 µm, continuous classification was performed.

Each component obtained by this classification operation was treated as follows. Specifically, coarse particles with particle diameter of 10 mm or more were pulverized by a pin mill (manufactured by Hosokawa Micron Corporation) and then supplied again to the classification device (0). Furthermore, the particles with particle diameter of 850 µm or more and less than 10 mm were transferred to the aforementioned (storing step). The particles with particle diameter of 150 µm or more and less than 850 µm were directly supplied to (surface cross-linking step) without undergoing the aforementioned (storing step), (pulverizing step), and (classification step). The water absorbent resin fine powder with particle diameter of less than 150 µm was transferred to (fine powder recycling step).

Meanwhile, although not described in Table 1, the pulverized products obtained from each of Examples 1 to 6 and Comparative Examples 1 to 4 have a moisture content of 5% by weight, which is the same as the dried polymer (1).

(Summary)

Based on the comparison of Examples 1 to 3 and Comparative Examples 1 and 2, it was found that, by using a dispersing device at the time of adding a dried polymer to a roll mill (the first method), ratio of fine powder generated from the pulverizing step (particles with particle diameter of less than 150 µm) is lowered, logarithmic standard deviation (σζ) of particle diameter distribution is improved, and liquid permeability (SFC) of the obtained water absorbent resin is improved.

Based on the comparison of Example 4 and Comparative Example 3, it was found that a significant difference in physical properties is obtained from the obtained water absorbent resin when a fine powder recycling step for increasing the yield is included.

Based on the comparison of Example 4 and Example 5, it was found that, by increasing the stage number of a roll mill, the weight average particle diameter (D50) can be reduced (476→341 µm) while maintaining the logarithmic standard deviation (σζ) of particle diameter distribution at almost constant level.

Based on the comparison of Example 4 and Example 6, it was found that, by having a classification step before pulverizing step, a coarse dried polymer and a dried polymer having a desired particle diameter are separated in advance, and thus the amount of fine powder is reduced.

Example 7

The water absorbent resin (P7) was obtained by performing the same operations as Example 5 except that the monomer aqueous solution of Example 5 is prepared in view

TABLE 1

| | | D50 [µm] | σζ [-] | Particle with particle diameter of 850 µm or more [wt %] | Particle with particle diameter of less than 150 µm [wt %] | | CRC [g/g] | AAP [g/g] | SFC [(1)] | FSR [(2)] |
|---|---|---|---|---|---|---|---|---|---|---|
| Comparative Example 1 | Comparative pulverized product (a1) | 456 | 0.65 | 2.8 | 11.9 | Comparative water absorbent resin (p1) | 26.9 | 22.5 | 112 | 0.22 |
| Example 1 | Pulverized product (A1) | 480 | 0.55 | 2.4 | 8.7 | Water absorbent resin (P1) | 26.8 | 22.8 | 118 | 0.20 |
| Example 2 | Pulverized product (A2) | 481 | 0.55 | 2.4 | 8.6 | Water absorbent resin (P2) | 26.9 | 22.6 | 120 | 0.20 |
| Example 3 | Pulverized product (A3) | 478 | 0.56 | 2.5 | 8.8 | Water absorbent resin (P3) | 26.7 | 22.6 | 117 | 0.20 |
| Comparative Example 2 | Comparative pulverized product (a2) | 457 | 0.63 | 2.7 | 11.3 | Comparative water absorbent resin (p2) | 26.8 | 22.7 | 113 | 0.22 |
| Example 4 | Pulverized product (A4) | 476 | 0.57 | 2.4 | 9.5 | Water absorbent resin (P4) | 26.7 | 22.6 | 114 | 0.25 |
| Comparative Example 3 | Comparative pulverized product (a3) | 453 | 0.69 | 2.7 | 14.6 | Comparative water absorbent resin (p3) | 26.7 | 22.3 | 104 | 0.28 |
| Example 5 | Pulverized product (A5) | 341 | 0.54 | 1.5 | 13.6 | Water absorbent resin (P5) | 26.6 | 22.8 | 105 | 0.30 |
| Comparative Example 4 | Comparative pulverized product (a4) | 340 | 0.65 | 1.9 | 17.2 | Comparative water absorbent resin (p4) | 26.7 | 22.5 | 98 | 0.31 |
| Example 6 | Pulverized product (A6) | 348 | 0.53 | 1.2 | 12.8 | Water absorbent resin (P6) | 26.8 | 22.7 | 107 | 0.30 |

(1) Unit of SFC [$\times 10^{-7} \cdot cm^3 \cdot s \cdot g^{-1}$]
(2) Unit of FSR [g/g/s]

of Example 2 of US 2012/258851 A and foaming polymerization having gas bubbles is performed.

The obtained water absorbent resin (P7) is porous and has high water absorbent speed, and its physical properties are as follows—CRC: 27.1 (g/g), AAP: 22.8 (g/g), SFC: 109 ($\times 10^{-7}$·s·cm$^3$·g$^{-1}$), FSR: 0.36 (g/g/s), internal gas bubbles ratio: 3.6%. Furthermore, the amount of fine powder after pulverization (amount of fine powder which has been removed by classification and recycled) was 16% by weight relative to the production amount.

Comparative Example 5

The comparative water absorbent resin (p4) was obtained by performing the same operations as Example 7 except that no dispersing device is used in the pulverizing step of Example 7. The physical properties of the obtained water absorbent resin (p4) are as follows—CRC: 26.6 (g/g), AAP: 22.5 (g/g), SFC: 96 ($\times 10^{-7}$·s·cm$^3$·g$^{-1}$), FSR: 0.38 (g/g/s), internal gas bubbles ratio: 3.4%. Furthermore, the amount of fine powder after pulverization (amount of fine powder which has been removed by classification and recycled) was 20% by weight relative to the production amount.

(Summary)

According to Example 7 and Comparative Example 5, a porous water absorbent resin was produced. However, it was found that a significant difference in fine powder amount and physical properties occurs depending on the presence or absence of a dispersing device. Meanwhile, in Comparative Examples 1 to 5, the amount of fine powder was high, and thus it was in a state in which clogging can easily occur during the classification step.

Example 8

Continuous operation for 92 days was performed at conditions of Example 5 to obtain the water absorbent resin (P8). Regarding the third-stage roll mill used in the pulverizing step, degree of roll clearance change was 5% and the width of roll clearance change was 10 µm, but the physical properties of the water absorbent resin (P8) were stable.

Comparative Example 6

Continuous operation for 92 days was performed at conditions of Comparative Example 4 to obtain the comparative water absorbent resin (p6). Regarding the third-stage roll mill used in the pulverizing step, degree of roll clearance change was 38% and the width of roll clearance change was enlarged to 120 µm. Further, a slow change in physical properties (weight average particle diameter, SFC, FSR) of the water absorbent resin (p6) was confirmed.

Example 9

Continuous operation for 150 days was performed at conditions of Example 5, and then the roll clearance of the third-stage roll mill, which has been enlarged by continuous operation, was adjusted. The adjustment was performed by returning a part exhibiting the maximum clearance to the clearance at initial operation stage (0.2 mm). After that, continuous operation was performed again for 150 days to obtain the water absorbent resin (P9).

Regarding the third-stage roll mill used in the pulverizing step, the maximum roll clearance during a period of 300 days in total was 214 µm and the width of roll clearance change was 30 µm, and thus the degree of roll clearance change was 14% (=30/214×100). However, physical properties of the water absorbent resin (P9) were stable.

After that, by performing the adjustment of third-stage roll clearance as described above, continuous operation can be performed even longer.

Comparative Example 7

Continuous operation for 150 days was performed at conditions of Comparative Example 4, and then the roll clearance of the third-stage roll mill was adjusted. The adjustment was performed by returning a part exhibiting the maximum clearance to the clearance at initial operation stage (0.2 mm). After that, continuous operation was performed again for 150 days to obtain the comparative water absorbent resin (p7).

Regarding the third-stage roll mill used in the pulverizing step, the maximum roll clearance during a period of 300 days in total was 370 µm and the width of roll clearance change was increased to 340 µm. As such, the degree of roll clearance change was 92% (=340/370×100). Further, a tendency of a slow change in physical properties (weight average particle diameter, SFC, FSR) of the comparative water absorbent resin (p7) was confirmed.

Furthermore, as there is a contact of one end of the third-stage roll mill, it was impossible to adjust again the roll clearance.

(Summary)

Based on the comparison of Examples 8 and 9 and Comparative Examples 6 and 7, it was found that, when no dispersing device is used, the dried polymer is concentrated on a center part of the roll mill and thus the center part of the roll wears off during an operation for a long period of time, and as a result, the physical properties are deteriorated.

Meanwhile, when a dispersing device is used (the first method), roll wearing is even, and thus roll replacement frequency is lowered and physical properties of a water absorbent resin are stable in the case of a long-term operation (in particular, continuous operation for 92 days (Example 8)) or a long-term operation for 300 days (Example 9)). For a long-term operation, in particular, a problem of having no possibility of re-adjustment due to the excessively increased width of roll clearance change can be avoided.

Meanwhile, Examples 8 and 9 are an example of having the second method (Example 8) and the third method (Example 9) of the present invention in addition to the first method of the present invention.

Production Example 2

(Classification Step Before Pulverizing)

The dried polymer (1) obtained from the drying step of Production Example 1 above was supplied to the classification device (0) having JIS standard sieves with a mesh size of 10 mm, 850 µm, and 150 µm for performing continuous classification.

Each component obtained by this classification operation was treated as follows. Specifically, coarse particles with particle diameter of 10 mm or more were pulverized by a pin mill (manufactured by Hosokawa Micron Corporation) and then supplied again to the classification device (0). Furthermore, the particles with particle diameter of 850 µm or more and less than 10 mm were transferred to the aforementioned (storing step). The particles with particle diameter of 150 µm or more and less than 850 µm were directly supplied to (surface cross-linking step) without undergoing the aforementioned (storing step), (pulverizing step), and (classification step). The water absorbent resin fine powder with particle diameter of less than 150 μm was transferred to (fine powder recycling step).

(Storing Step)

Particles with particle diameter of 850 μm or more and less than 10 mm (referred to as the dried polymer (2); D50 2.8 mm), which have been obtained from the classification step before pulverizing, were transferred using a bucket conveyor and added to a hopper. The hopper and the transport pipe have been heated by steam trace, and the temperature of the dried polymer (2) within the hopper was about 60° C. In the hopper, the dried polymer (2) was holded for 15 minutes on average.

Example 10

(Pulverizing Step)

The dried polymer (2) obtained from Production Example 2 was discharged at 600 (kg/hr) from the bottom of hopper by using a quantitative feeder. After that, it was dropped into a second-stage roll mill for pulverization. Meanwhile, regarding the second-stage roll mill, a screw type feeder dispersing device, which is a rotary type dispersing device shown in FIG. 1 and FIG. 2, is installed at an entrance of (right above) the top-stage roll mill, and the dried polymer (2) is dispersed by the dispersing device and introduced to the second-stage roll mill. With this operation, the pulverized product (G10) was obtained.

Meanwhile, specifications and operation conditions of the second-stage roll mill were as described below.

The specifications include; roll length: 60 cm, roll diameter: 30 cm, roll material: centrifugal chilled cast iron, inside wall of roll mill: SUS304 buff finishing, roll surface: grooves having an angle of 3° relative to rotation axis of a roll are present, and the operation conditions include: roll rotation number: 400 rpm and 600 rpm (a pair of rolls has different speed, and by having the same roll size, peripheral speed ratio was 1:1.5, same for both the first stage and second stage), roll clearance: 700 μm (first stage), 200 μm (second stage), roll mill temperature: about 60° C., atmospheric temperature within the roll mill: about 60° C., atmospheric dew point within the roll mill: about 11° C. (relative humidity of 7% RH), temperature of the dried polymer (2): 60° C., and reduced pressure within the roll mill and adjacent pipes: 0.1 kPa.

(Classification Step)

Subsequently, the entire amount of the pulverized product (G10) which has been obtained from the above pulverizing step was continuously supplied to a classification device (1) (classification device consisting of a metal sieve with a mesh size of 850 μm/150 μm in order from top to bottom/manufactured by MINOX; sieve diameter 600 mm) for classification.

According to this classification operation, particles present between a sieve with a mesh size of 850 μm and a sieve with a mesh size of 150 μm were obtained as the water absorbent resin powder (B10) and particles passed through a sieve with a mesh size of 150 μm were obtained as the water absorbent resin fine powder (F10).

(Fine Powder Recycling Step)

For performing fine powder granulation, 120 parts by weight of pure water for industrial use were added to 100 parts by weight of the water absorbent resin fine powder (F10), which has been obtained from a classification step, by spraying in a high speed mixer which is different from that of the surface cross-linking step (turbulizer/1000 rpm; manufactured by Hosokawa Micron). The granulated gel derived from the water absorbent resin fine powder (F10), which is obtained by this granulation operation, was added to the aforementioned particulated hydrogel (1) for recycling.

(Surface Cross-Linking Step)

Next, after preparing a surface cross-linking agent solution consisting of 0.5 part by weight of ethylene carbonate and 3 parts by weight of pure water for industrial use, it was added to 100 parts by weight of the water absorbent resin powder (B10) obtained from above classification step by spraying in a high speed mixer (turbulizer/1000 rpm; manufactured by Hosokawa Micron). After that, it was transferred to a paddle dryer and subjected to a heat treatment at 198° C. (temperature of heating medium) for 30 to 40 minutes. Meanwhile, fine adjustment of the heat treatment time was repeated such that water absorption capacity (CRC) of the water absorbent resin (P10) is 27 g/g.

After the heat treatment, forced cooling was performed by using a paddle type cooler until the temperature of the surface crosslinked water absorbent resin (S10) becomes 60° C.

(Remoistening Step)

During the cooling, a treatment agent consisting of 0.3 part by weight of aluminum sulfate, 1 part by weight of water, and 0.03 part by weight of propylene glycol was added to 100 parts by weight of the surface crosslinked water absorbent resin (S10).

(Sizing Step)

Subsequently, the water absorbent resin after the remoistening step was classified by using the classification device (2) equipped with a JIS standard sieve with a mesh size of 850 μm, and it was pulverized by a flash mill until the pass though of the entire amount of the powder. According to this operation, the water absorbent resin (P10) with a particle diameter of less than 850 μm was obtained.

By continuing the above series of continuous production for at least one day, physical properties of the water absorbent resin of each step were stabilized. Physical properties of the pulverized product (G10) and physical properties of the water absorbent resin (P10) after the stable operation were shown in Table 2 and Table 3, respectively.

Furthermore, as a result of performing intermittently the above series of continuous production for at least one year, the roll shows uneven wearing but it can be dealt with an adjustment of roll clearance so that roll replacement was unnecessary.

Examples 11 and 12

The pulverized product (G11, G12) and the water absorbent resin (P11, P12) were obtained by performing the same operation as Example 10 except that the operation conditions for roll mill are changed to those described in Table1. Physical properties of the pulverized product (G11, G12) and physical properties of the water absorbent resin (P11, P12) after the stable operation were shown in Table 2 and Table 3, respectively.

Examples 13 to 15

Reference Example 1

The pulverized product (G13 to 15) and the water absorbent resin (P13 to 15) were obtained by performing the same operation as Example 10 except that the operation conditions for roll mill are changed to those described in Table 2. Meanwhile, in Reference Example 1, there was tendency of having deposition of a dried polymer on the roll, and thus it was terminated before stable operation. Physical properties of the pulverized product (G13 to G15) and physical properties of the water absorbent resin (P13 to P15) after the stable operation were shown in Table 2 and Table 3, respectively.

Meanwhile, in Example 14, it was possible to perform intermittently a series of continuous production even though vibration of roll mill was slightly high. About 6 months later, rolls were in contact with each other due to vibration which occurs during operation at an area in which minimum roll clearance is exhibited due to uneven wearing of a roll. Thus, it was impossible to perform an adjustment for reducing the roll clearance, and thus the roll was inevitably changed.

Example 16

The pulverized product (G16) and the water absorbent resin (P16) were obtained in the same manner as Example 11 except that a change is made for Example 11 to have the dried polymer (3) obtained from Production Example 3. Physical properties of the pulverized product (G16) and physical properties of the water absorbent resin (P16) after the stable operation were shown in Table 2 and Table 3, respectively.

TABLE 2

| | Dried polymer Moisture content [wt %] | Roll rotation number | | Peripheral speed | | Peripheral speed ratio Low speed: High speed | Roll clearance | | Pulverized product | | | | |
|---|---|---|---|---|---|---|---|---|---|---|---|---|---|
| | | High speed roll [rpm] | Low speed roll [rpm] | High speed roll [m/s] | Low speed roll [m/s] | | First-stage [μm] | Second-stage [μm] | | D50[1] [μm] | 850↑[2] [wt %] | 150↓[3] [wt %] | Gap/D50[4] [Times] |
| Example 10 | 5.0 | 600 | 400 | 9.4 | 6.3 | 1:1.5 | 700 | 200 | Pulverized product(G10) | 480 | 3.0 | 12 | 0.42 |
| Example 11 | 5.0 | 600 | 240 | 9.4 | 3.8 | 1:2.5 | 700 | 200 | Pulverized product(G11) | 380 | 2.0 | 15 | 0.53 |
| Example 12 | 5.0 | 600 | 120 | 9.4 | 1.9 | 1:5 | 700 | 300 | Pulverized product(G12) | 430 | 3.0 | 12 | 0.70 |
| Example 13 | 5.0 | 600 | 600 | 9.4 | 9.4 | 1:1 | 700 | 200 | Pulverized product(G13) | 620 | 6.0 | 10 | 0.32 |
| Example 14 | 5.0 | 600 | 600 | 9.4 | 9.4 | 1:1 | 700 | 100 | Pulverized product(G14) | 470 | 3.0 | 15 | 0.21 |
| Reference Example 1 | 5.0 | 600 | 40 | 9.4 | 0.6 | 1:15 | 700 | 200 | Reference Pulverized product(G'1) | 370 | 2.0 | 15 | 0.54 |
| Example 15 | 5.0 | 3000 | 200 | 47.1 | 3.1 | 1:15 | 700 | 400 | Pulverized product(G15) | 400 | 2.0 | 18 | 1.00 |
| Example 16 | 2.0 | 600 | 240 | 9.4 | 3.8 | 1:2.5 | 700 | 200 | Pulverized product(G16) | 380 | 2.0 | 18 | 0.53 |

[1] D50; Weight average particle diameter of pulverized product (μm),
[2] 850↑; Ratio of particles with particle diameter of 850 μm or more (% by weight),
[3] 150↓; Ratio of particles with particle diameter of less than 150 μm (% by weight),
[4] Gap/D50; Ratio of the minimum roll clearance value relative to the weight average particle diameter (D50) of pulverized product Meanwhile, Reference Example 1 and Example 14 are comparative examples with regard to the fourth method of the present invention. Namely, as defined by the fourth method, the dried polymer has a moisture content of 3.0 to 15% by weight, at least one pair of rolls of a roll mill used for a pulverizing step includes a low speed roll and a high speed roll which rotate in opposite directions with peripheral speed ratio of preferably 1:1.05 to 1:10.

Production Example 3

The dried polymer (weight average particle diameter (D50); 2.4 mm, logarithmic standard deviation (σζ) of particle diameter distribution; 0.85, the moisture content; 2.0% by weight), which has been obtained by the aforementioned Production Example 1 except that the supply amount of the particulate hydrogel (1) to a dryer is ½ of Production Example 1, was subjected to the same operation as Production Example 2 to obtain the dried polymer (3).

TABLE 3

| | | Water absorbent resin | | | |
|---|---|---|---|---|---|
| | | Water absorption capacity (CRC) [g/g] | Saline Flow Conductivity (SFC) [×10$^{-7}$·cm$^3$·s·g$^{-1}$] | Water absorption speed (FSR) [g/g/s] | Water absorption capacity under load (AAP) [g/g] |
| Example 10 | Water absorbent resin (P10) | 27 | 113 | 0.19 | 23 |
| Example 11 | Water absorbent resin (P11) | 27 | 118 | 0.24 | 23 |
| Example 12 | Water absorbent resin (P12) | 27 | 120 | 0.21 | 23 |
| Example 13 | Water absorbent resin (P13) | 27 | 130 | 0.14 | 23 |
| Example 14 | Water absorbent resin (P14) | 27 | 109 | 0.20 | 23 |

TABLE 3-continued

| | | Water absorbent resin | | | |
|---|---|---|---|---|---|
| | | Water absorption capacity (CRC) [g/g] | Saline Flow Conductivity (SFC) [×10⁻⁷ · cm³ · s · g⁻¹] | Water absorbent speed (FSR) [g/g/s] | Water absorption capacity under load (AAP) [g/g] |
| Reference Example 1 | Terminated during process | — | — | — | — |
| Example 15 | Water absorbent resin (P15) | 27 | 105 | 0.24 | 23 |
| Example 16 | Water absorbent resin (P16) | 27 | 107 | 0.25 | 23 |

(Summary)

When comparison is made among Example 13 (peripheral speed ratio 1:1), Example 10 (peripheral speed ratio 1:1.5), and Example 11 (peripheral speed ratio 1:2.5), in which rotation number of the low speed roll and also the peripheral speed ratio are different, it was found that the weight average particle diameter (D50) of the pulverized product is in the following order: the pulverized product (G11)<the pulverized product (G10)<the pulverized product (G13). As a result, the water absorbent speed (FSR) of the water absorbent resin (P13) was very poor.

When Example 10 is compared to Example 14 in which the roll clearance is narrowed in view of Example 13, it was found that, although the weight average particle diameter D50 of a pulverized product is almost same, ratio of the fine powder included therein is lower in the pulverized product (G10) compared to the pulverized product (G14). As the fine powder decreases in a pulverized product, cost relating to granulation of the fine powder or cost for drying it can be saved, and the water absorption performance (in particular, liquid permeability) of the obtained water absorbent resin (P10) is improved compared to the water absorbent resin (P14). Furthermore, in Example 14, re-adjustment of roll clearance cannot be made even for small uneven wearing as a result of narrowing the roll clearance. Thus, roll lifetime was shorter than that of Examples 10 to 12.

The pulverized product (G12) of Example 12 (peripheral speed ratio 1:5) is more finely pulverized even though it has the same amount of fine powder as the pulverized product (G10) of Example 10 (peripheral speed ratio 1:1.5), and thus it can enhance the water absorbent speed (FSR) of the water absorbent resin (G12).

According to Reference Example 1 (peripheral speed ratio 1:15), it was impossible to process the dried polymer which could have been pulverized at the aforementioned conditions.

Example 15, in which speed of a high speed roll and a low speed roll is increased with the same peripheral speed ratio compared to Reference Example 1, exhibited an increased pulverizing ability. However, the pulverized product (G15) exhibited an increased amount of fine powder compared to the pulverized product (G11) of Example 11, which has a slightly smaller weight average particle diameter D50. Liquid permeability (SFC) of the water absorbent resin (P15) was also inferior to the water absorbent resin (P11).

When Example 11 is compared to Example 16 in which a moisture content of the dried polymer is reduced to 2% by weight, the pulverized product (G16) exhibited an increased amount of fine powder compared to the pulverized product (G11) of Example 11. Liquid permeability (SFC) of the water absorbent resin (P16) was also inferior to the water absorbent resin (P11).

Comparative Example 8

The comparative pulverized product (a8) and the comparative water absorbent resin (p8) were obtained by performing the same operation as Comparative Example 1 except that the grooves of Comparative Example 1 which have an angle of 3° relative to rotation axis of a roll are changed to grooves having an angle of 0° relative to rotation axis of a roll. The obtained comparative pulverized product (a8) was sampled and used for particle size measurement. The results are shown in Table 4.

Comparative Example 9

The comparative pulverized product (a9) and the comparative water absorbent resin (p9) were obtained by performing the same operation as Comparative Example 1 except that the grooves of Comparative Example 1 which have an angle of 3° relative to rotation axis of a roll are changed to grooves having an angle of 90° relative to rotation axis of a roll. The obtained comparative pulverized product (a9) was sampled and used for particle size measurement. The results are shown in Table 4. Meanwhile, as the dried polymer (1) is poorly bitten by the roll mill, part of the dried polymer (1) remains on the roll mill, which necessitates a removal process.

Example 17

The pulverized product (A17) and the water absorbent resin (P17) were obtained by performing the same operation as Example 1 except that the grooves of Example 1 which have an angle of 3° relative to rotation axis of a roll are changed to grooves having an angle of 0° relative to rotation axis of a roll. The pulverized product (A17) was sampled and used for particle size measurement. The results are shown in Table 4.

Example 18

The pulverized product (A18) and the water absorbent resin (P18) were obtained by performing the same operation as Example 1 except that the grooves of Example 1 which have an angle of 3° relative to rotation axis of a roll are changed to grooves having an angle of 90° relative to rotation axis of a roll. The obtained pulverized product (A18) was sampled and used for particle size measurement. The results are shown in Table 4. Meanwhile, as the dried polymer (1) is poorly bitten by the roll mill, part of the dried polymer (1) remains on the roll mill, which necessitates a removal process.

TABLE 4

| | | D50 [μm] | σζ [—] | Particle with parrticle diameter of 850 μm or more [wt %] | Particle with particle diameter of less than 150 μm [wt %] |
|---|---|---|---|---|---|
| Comparative Example 8 | Comparative pulverized product (a8) | 452 | 0.69 | 3.1 | 12.4 |

TABLE 4-continued

| | | D50 [μm] | σζ [—] | Particle with particle diameter of 850 μm or more [wt %] | Particle with particle diameter of less than 150 μm [wt %] |
|---|---|---|---|---|---|
| Comparative Example 9 | Comparative pulverized product (a9) | 512 | 0.58 | 5.5 | 5.2 |
| Example 17 | Pulverized product (A17) | 472 | 0.60 | 3.4 | 8.6 |
| Example 18 | Pulverized product (A18) | 525 | 0.50 | 5.2 | 4.8 |

(Summary)

Based on the comparison between Comparative Example 1 and Comparative Examples 8 and 9, and Example 1 and Examples 17 and 18, it was found that the particle diameter of a pulverized product is affected by the inclination angle of grooves of a roll. Specifically, when the inclination angle relative to the rotation axis of a roll is 0°, the water absorbent resin fine powder with particle diameter of less than 150 μm is produced in a large amount. When the inclination angle is 90°, taken-up (easy incorporation) of the dried polymer by the roll mill was poor so that the weight average particle diameter (D50) exhibited a high value. To narrow the weight average particle diameter (D50) of pulverized product, for example from 520 μm to 480 μm or so of Example 1, it is necessary to further narrow the roll clearance. Based on the findings described above, it was recognized that the fifth method of the present invention is preferable.

INDUSTRIAL APPLICABILITY

The method for producing a polyacrylic acid (salt)-based water absorbent resin according to the present invention can be applied to production, in particular, large scale production, of a water absorbent resin. Furthermore, the polyacrylic acid (salt)-based water absorbent resin obtained by the present invention is suitable for a use as an absorbent body of hygiene product such as a disposable diaper.

REFERENCE SIGNS LIST

1 Pipe for supplying dried polymer
2 Screw feeder
2' Slit type dispersing device
3 Hopper
4 Dried polymer
5 Roll of roll mill
6 Pulverized product
7 Guide plate
8 Mountain type dispersing plate
9 Rotary part of screw type feeder
10 Feeder having pin type rotary blade

The invention claimed is:

1. A method for producing polyacrylic acid (salt)-based water absorbent resin, the method comprising, in order, a step in which an acrylic acid (salt)-based monomer aqueous solution is polymerized, a step in which the water-containing gel-like crosslinked polymer obtained in the polymerization step is dried, a step in which the dried polymer obtained in the drying step is pulverized, and a classification step which takes place after the drying step or after the pulverization step, wherein, at the time of providing the dried polymer to a roll mill used in the pulverizing step, the dried polymer is provided in a dispersed state in the axial direction of a roll of the roll mill; and
wherein an apparatus used for the pulverizing step comprises a pipe for supplying the dried polymer to the roll mill, and a length of the roll of the roll mill is 2 to 100 times the pipe diameter, and when said pipe is an angular pipe, said length of the roll of the roll mill is 2 to 100 time an inner width of the angular pipe.

2. The method according to claim 1, comprising a classification step in which the dried polymer obtained from the drying step is classified before pulverization by the roll mill, wherein a non-passing material on a sieve used for the classification step is separated, and the separated non-passing material is pulverized by a pulverizing method other than the roll mill.

3. The method according to claim 1, wherein a moisture content of the dried polymer is 3.0 to 15% by weight right before the pulverization by the roll mill.

4. The method according to claim 1, wherein the dried polymer is dispersed by a mechanical dispersing means.

5. The method according to claim 1, wherein a supply amount of the dried polymer in a part with the highest supply is 1.0 to 10 times the supply amount of the dried polymer in a part with the lowest supply when the roll of the roll mill is divided into the three identical parts in the axial direction of roll
and/or
the dried polymer is supplied to the roll mill within a feed width ratio range of 80 to 99%, with the proviso that the feed width ratio is defined by the following formula:

$$\text{Feed width ratio (\%)} = \left(\frac{\text{Length of the portion on roll to which dried polymer is supplied}}{\text{(Roll length)}}\right) \times 100.$$

6. The method according to claim 1, wherein the roll mill has a convex-concave pattern in which grooves are aligned in a stripe shape on a roll surface and the grooves are tilted at 1 to 89° relative to a rotation axis of the roll.

7. The method according to claim 1, wherein at least one pair of rolls of the roll mill comprises a low speed roll and a high speed roll rotating in opposite directions and a peripheral speed ratio thereof is 1:1.05 to 1:10.

8. The method according to claim 7, wherein a peripheral speed of the low speed roll is 0.7 to 15 (m/s).

9. The method according to claim 1, wherein the minimum roll clearance of the roll mill is 100 to 1000 mm and the pulverization is made such that a pulverized product obtained from the pulverizing step has a weight average particle diameter (D50) that is 0.5 to 2.0 times the minimum value of the roll clearance.

10. The method according to claim 1, wherein an atmospheric temperature of the pulverizing step is 30 to 100° C. and a relative humidity of an atmosphere is 50% RH or less.

11. The method according to claim 1, wherein the pulverizing step is performed under reduced pressure and/or air stream.

12. The method according to claim 1, wherein, in the pulverizing step in which process capacity per roll mill used for the pulverizing step is 100 (kg/hr) or more and total pulverization time is 30 days or more, the dried polymer is pulverized at conditions including that the width of roll clearance change is 100 mm or less and/or the degree of roll clearance change is 50% or less, with the proviso that the width of roll clearance change and degree of roll clearance change are defined by the following formulae:

Width of roll clearance change (mm)=(Maximum width of clearance between a pair of rolls)−(Minimum width of clearance between a pair of rolls)

$$\text{Degree of roll clearance change (\%)} = \frac{\left\{\begin{pmatrix}\text{Maximum width of clearance between} \\ \text{a pair of rolls}\end{pmatrix} - \begin{pmatrix}\text{Minimum width of clearance between} \\ \text{a pair of rolls}\end{pmatrix}\right\}}{(\text{Maximum width of clearance between a pair of rolls})} \times 100.$$

13. The method according to claim 1, wherein, in the pulverizing step in which process capacity per roll mill used for the pulverizing step is 100 (kg/hr) or more and total pulverization time is 200 days or more, the dried polymer is pulverized at conditions including that the width of roll clearance change is 300 mm or less and/or the degree of roll clearance change is 90% or less, with the proviso that the width of roll clearance change and the degree of roll clearance change are defined by the following formulae:

Width of roll clearance change (mm)=(Maximum width of clearance between a pair of rolls)−(Minimum width of clearance between a pair of rolls)

$$\text{Degree of roll clearance change (\%)} = \frac{\left\{\begin{pmatrix}\text{Maximum width of clearance between} \\ \text{a pair of rolls}\end{pmatrix} - \begin{pmatrix}\text{Minimum width of clearance between} \\ \text{a pair of rolls}\end{pmatrix}\right\}}{(\text{Maximum width of clearance between a pair of rolls})} \times 100.$$

14. The method according to claim 1, wherein a water absorbent resin to be obtained has a weight average particle diameter (D50) of 200 to 600 mm.

15. The method according to claim 1, wherein a water absorbent resin to be obtained has water absorbent speed (FSR) of 0.20 (g/g/s) or more and saline flow conductivity (SFC) of 10 ($\times 10^{-7} \cdot cm^3 \cdot s \cdot g^{-1}$) or more.

* * * * *